(12) United States Patent
Sabharwal et al.

(10) Patent No.: US 12,524,805 B2
(45) Date of Patent: Jan. 13, 2026

(54) METHOD AND SYSTEM FOR PERFORMING CLOUD VENDOR ARBITRAGE USING ARTIFICIAL INTELLIGENCE (AI)

(71) Applicant: HCL Technologies Limited, New Delhi (IN)

(72) Inventors: Navin Sabharwal, New Delhi (IN); Amit Agrawal, Mathura (IN)

(73) Assignee: HCL Technologies Limited, New Delhi (IN)

( * ) Notice: Subject to any disclaimer, the term of this patent is extended or adjusted under 35 U.S.C. 154(b) by 43 days.

(21) Appl. No.: 17/537,535

(22) Filed: Nov. 30, 2021

(65) Prior Publication Data

US 2024/0104652 A1    Mar. 28, 2024

(51) Int. Cl.
*G06Q 40/04* (2012.01)
*G06N 3/08* (2023.01)
*G06N 3/10* (2006.01)

(52) U.S. Cl.
CPC ............ *G06Q 40/04* (2013.01); *G06N 3/08* (2013.01); *G06N 3/10* (2013.01)

(58) Field of Classification Search
CPC ...... G06Q 40/04; G06Q 30/0206; G06N 3/08; G06N 3/10; G06N 3/006
USPC ......... 705/37, 38, 40, 39, 7.29, 71; 709/225, 709/238, 224; 704/4, 235; 700/48; 370/252, 356; 713/170; 726/25, 7;
(Continued)

(56) References Cited

U.S. PATENT DOCUMENTS

| | | | |
|---|---|---|---|
| 8,606,575 B1 * | 12/2013 | Witt-ehsani | ........ G10L 15/1822 704/4 |
| 9,813,318 B2 | 11/2017 | Iyoob et al. | |
| 9,818,127 B2 | 11/2017 | Iyoob et al. | |

(Continued)

FOREIGN PATENT DOCUMENTS

JP    6467360 B2    2/2019

OTHER PUBLICATIONS

A Learning-based Dynamic Load Balancing Approach for Microservice Systems in Multi-cloud Environment; 2020 IEEE 26th International Conference on Parallel and Distributed Systems (ICPADS) (pp. 334-341); Jieqi Cui, Pengfei Chen, Guangba Yu; Dec. 2, 2020. (Year: 2020).*

(Continued)

*Primary Examiner* — Tien C Nguyen
(74) *Attorney, Agent, or Firm* — Kendal M. Sheets

(57) ABSTRACT

A method and system for performing cloud vendor arbitrage using AI is disclosed. The method includes receiving each of a plurality of metrices for each of a set of components associated with an application and infrastructure deployment, and creating one or more feature vectors corresponding to each of the plurality of metrices. The one or more feature vectors are created based on corresponding one or more first pre-trained machine learning models. The method further includes predicting a metric value corresponding to each of plurality of metrices, based on assessing of the one or more feature vectors using corresponding one or more first pre-trained machine learning models and performing cloud vendor arbitrage by computing prices for each of the set of components from price data received from each of a plurality of cloud vendors. The method further includes determining a cloud preference from at least one of plurality of cloud vendors.

18 Claims, 15 Drawing Sheets

(58) Field of Classification Search
USPC .............. 707/706, 769; 719/313; 348/144; 244/76 R; 701/2
See application file for complete search history.

(56) References Cited

U.S. PATENT DOCUMENTS

| | | | |
|---|---|---|---|
| 9,824,390 B2 | 11/2017 | Adapalli et al. | |
| 2008/0154790 A1* | 6/2008 | Hiatt | G06Q 40/06 705/37 |
| 2013/0132160 A1* | 5/2013 | Hansen | G06Q 30/0205 705/7.35 |
| 2014/0279178 A1* | 9/2014 | Harman | G06Q 30/0611 705/26.4 |
| 2014/0280966 A1 | 9/2014 | Sapuram et al. | |
| 2015/0341230 A1* | 11/2015 | Dave | G06Q 30/0201 705/7.29 |
| 2016/0078866 A1* | 3/2016 | Gelfenbeyn | G06F 40/247 704/235 |
| 2016/0198003 A1* | 7/2016 | Luft | H04L 67/63 709/225 |
| 2017/0180284 A1* | 6/2017 | Smullen | H04L 63/18 |
| 2018/0024510 A1* | 1/2018 | Matsushima | G06N 3/063 700/48 |
| 2018/0351816 A1* | 12/2018 | Li | G06F 11/3452 |
| 2019/0130904 A1* | 5/2019 | Homma | G06N 3/088 |
| 2020/0034135 A1* | 1/2020 | Shi | G06N 20/00 |
| 2020/0104777 A1* | 4/2020 | Bouhini | G06Q 10/063112 |
| 2020/0334607 A1* | 10/2020 | Fadel | G06Q 10/06375 |
| 2021/0184925 A1* | 6/2021 | Narayanan | H04L 41/0816 |
| 2021/0314325 A1* | 10/2021 | Rose | G06N 3/08 |

OTHER PUBLICATIONS

An user-centric billing model for cloud computing; 2012 International Conference on Cloud Computing Technologies, Applications and Management (ICCCTAM) (pp. 132-138); Anand Kumar, R. Mittal, R.K.; Dec. 8, 2012. (Year: 2012).*

Business intelligence software as a service (SAAS); 2011 IEEE 3rd International Conference on Communication Software and Networks (pp. 641-649); Ouf, S., Nasr, M., Amr, M., Mosaad, M., Kamal, K., Mostafa, F., Said, R., Mohamed, S.; May 1, 2011. (Year: 2011).*

Eric Marks, "How to Compare Cloud Providers, Services, and Prices in 2020" (https://cloudspectator.com/how-to-compare-cloud-providers-services-and-prices/).

Dominic Ayres, "Common Cloud Pricing Challenges and 5 Calculators That Can Help You Figure It Out" (https://www.contino.io/insights/common-cloud-pricing-challenges-and-5-calculators-that-can-help-you-figure-it-out).

* cited by examiner

300A

| Component ID | Component Name | Component Type | Date | Deployment Type | Instance Type | Number of connections | Number of Users |
|---|---|---|---|---|---|---|---|
| 1 | MS SQL Server | Database | 01 January 2020 | HA | On Demand | 100 | 50 |
| 2 | MS SQL Server | Database | 10 January 2020 | Non-HA | On Demand | 300 | 20 |

| Component ID | C1 | Component Type | Date (Week) | D1 | D2 | I1 | I2 | Number of connections | Number of Users |
|---|---|---|---|---|---|---|---|---|---|
| 1 | MS SQL Server | 0 | 1st Week | 1 | 0 | 1 | 0 | 100 | 50 |
| 2 | MS SQL Server | 0 | 2nd Week | 0 | 1 | 0 | 1 | 300 | 20 |

FIG. 3B

| Component ID | Component Name | Recommended Cloud Vendor | Number of Positive Feedbacks | Number of Negative Feedbacks |
|---|---|---|---|---|
| 1 | MS SQL Server | AWS | 3 | 1 |
| 2 | Apache Web Server | AWS | 2 | 0 |
| 3 | MS SQL Server | GCP | 4 | 0 |

METHOD AND SYSTEM FOR PERFORMING CLOUD VENDOR ARBITRAGE USING ARTIFICIAL INTELLIGENCE (AI)

TECHNICAL FIELD

Generally, the disclosure relates to Artificial Intelligence (AI). More specifically, the disclosure relates to a method and system for performing cloud vendor arbitrage with cloud platforms using AI based technologies.

BACKGROUND

Typically, cloud computing allows organizations to consume computing resources, such as, virtual machines, databases, processing, memory, services, storage, messaging, events, and pay-as-you-go. Nowadays, everything, like infrastructure, software, applications, services, products, or even an operating system makes way to a cloud platform. Hence, the cloud computing has multiplied over the past several years and organizations are increasingly transitioning to different cloud services.

For organizations, moving some or all Information Technology (IT) functions to cloud vendors of the cloud platforms, may bring an entirely new set of pricing challenges. Additionally, it may be very difficult to identify which cloud platform should be deployed for an application or infrastructure as it is dependent on many factors. Such factors may include, without limitation, nature of company (such as, finance domain and health domain), user demographic region to identify load on associated system from region, type of cloud (public, private or hybrid), application or infrastructure lifetime, deployment strategy (high availability and disaster recovery), availability of required components in a required region, security and monitoring, and components/services used (such as, a database, a web server, a logging service, a monitoring service). Further, existing systems cannot pro-actively identify performance of components of deployed applications and that the component may fail in near future.

Accordingly, there is a need for a method and system to get a firm handle on cloud costs, analyze performance degradation of components and determine cloud preferences from different cloud vendors for the organization.

SUMMARY OF INVENTION

In accordance with one embodiment, a method for performing cloud vendor arbitrage using Artificial Intelligence (AI) is disclosed. The method may include receiving, by an AI based cloud vendor arbitrage system, each of a plurality of metrices for each of a set of components associated with an application and infrastructure deployment. The method may further include creating, by the AI based cloud vendor arbitrage system, one or more feature vectors corresponding to each of the plurality of metrices, based on one or more features determined for each of the plurality of metrices. In accordance with an embodiment, the one or more feature vectors are created based on corresponding one or more first pre-trained machine learning models. The method may further include predicting, by the AI based cloud vendor arbitrage system, a metric value corresponding to each of the plurality of metrices, based on assessing of the one or more feature vectors using corresponding one or more first pre-trained machine learning models. The method may further include performing, by the AI based cloud vendor arbitrage system, the cloud vendor arbitrage by computing prices for each of the set of components from price data received from each of a plurality of cloud vendors, based on the metric value predicted corresponding to each of the plurality of metrices. The method may further include determining, by the AI based cloud vendor arbitrage system, a cloud preference from at least one of the plurality of cloud vendors for the application and infrastructure deployment, based on comparison of prices from the computed prices, in response to the performing of the cloud vendor arbitrage.

In another embodiment, a system for performing cloud vendor arbitrage using Artificial Intelligence (AI) is disclosed. The system includes a processor and a memory communicatively coupled to the processor. The memory may store processor-executable instructions, which, on execution, may causes the processor to receive each of a plurality of metrices for each of a set of components associated with an application and infrastructure deployment. The processor-executable instructions, on execution, may further cause the processor to create one or more feature vectors corresponding to each of the plurality of metrices, based on one or more features determined for each of the plurality of metrices. In accordance with an embodiment, the one or more feature vectors are created based on corresponding one or more first pre-trained machine learning models. The processor-executable instructions, on execution, may further cause the processor to predict a metric value corresponding to each of the plurality of metrices, based on assessing of the one or more feature vectors using corresponding one or more first pre-trained machine learning models. The processor-executable instructions, on execution, may further cause the processor to perform the cloud vendor arbitrage by computing prices for each of the set of components from price data received from each of a plurality of cloud vendors, based on the metric value predicted corresponding to each of the plurality of metrices. The processor-executable instructions, on execution, may further cause the processor to determine a cloud preference from at least one of the plurality of cloud vendors for the application and infrastructure deployment, based on comparison of prices from the computed prices, in response to the performing of the cloud vendor arbitrage.

In yet another embodiment, a non-transitory computer-readable medium storing computer-executable instruction for performing cloud vendor arbitrage using Artificial Intelligence (AI) is disclosed. The stored instructions, when executed by a processor, may cause the processor to perform operations including receiving each of a plurality of metrices for each of a set of components associated with an application and infrastructure deployment. The operations may further include creating one or more feature vectors corresponding to each of the plurality of metrices, based on one or more features determined for each of the plurality of metrices. In accordance with an embodiment, the one or more feature vectors are created based on corresponding one or more first pre-trained machine learning models. The operations may further include predicting a metric value corresponding to each of the plurality of metrices, based on assessing of the one or more feature vectors using corresponding one or more first pre-trained machine learning models. The operations may further include performing the cloud vendor arbitrage by computing prices for each of the set of components from price data received from each of a plurality of cloud vendors, based on the metric value predicted corresponding to each of the plurality of metrices. The operations may further include determining a cloud preference from at least one of the plurality of cloud vendors for the application and infrastructure deployment, based on comparison of prices from the computed prices, in response to the performing of the cloud vendor arbitrage.

It is to be understood that both the foregoing general description and the following detailed description are exemplary and explanatory only and are not restrictive of the invention, as claimed.

BRIEF DESCRIPTION OF THE DRAWINGS

The present disclosure can be best understood by reference to the following description taken in conjunction with the accompanying drawing figures, in which like parts may be referred to by like numerals

FIGS. 3A-3B collectively illustrate tabular representations for input data corresponding to plurality of metrices associated with components of cloud vendors, in accordance with an exemplary embodiment.

FIG. 5 illustrates a tabular representation 500 of exemplary input data corresponding to the plurality of metrices for re-ranking cloud vendors, in accordance with an exemplary embodiment.

DETAILED DESCRIPTION OF THE DRAWINGS

Figure 1:
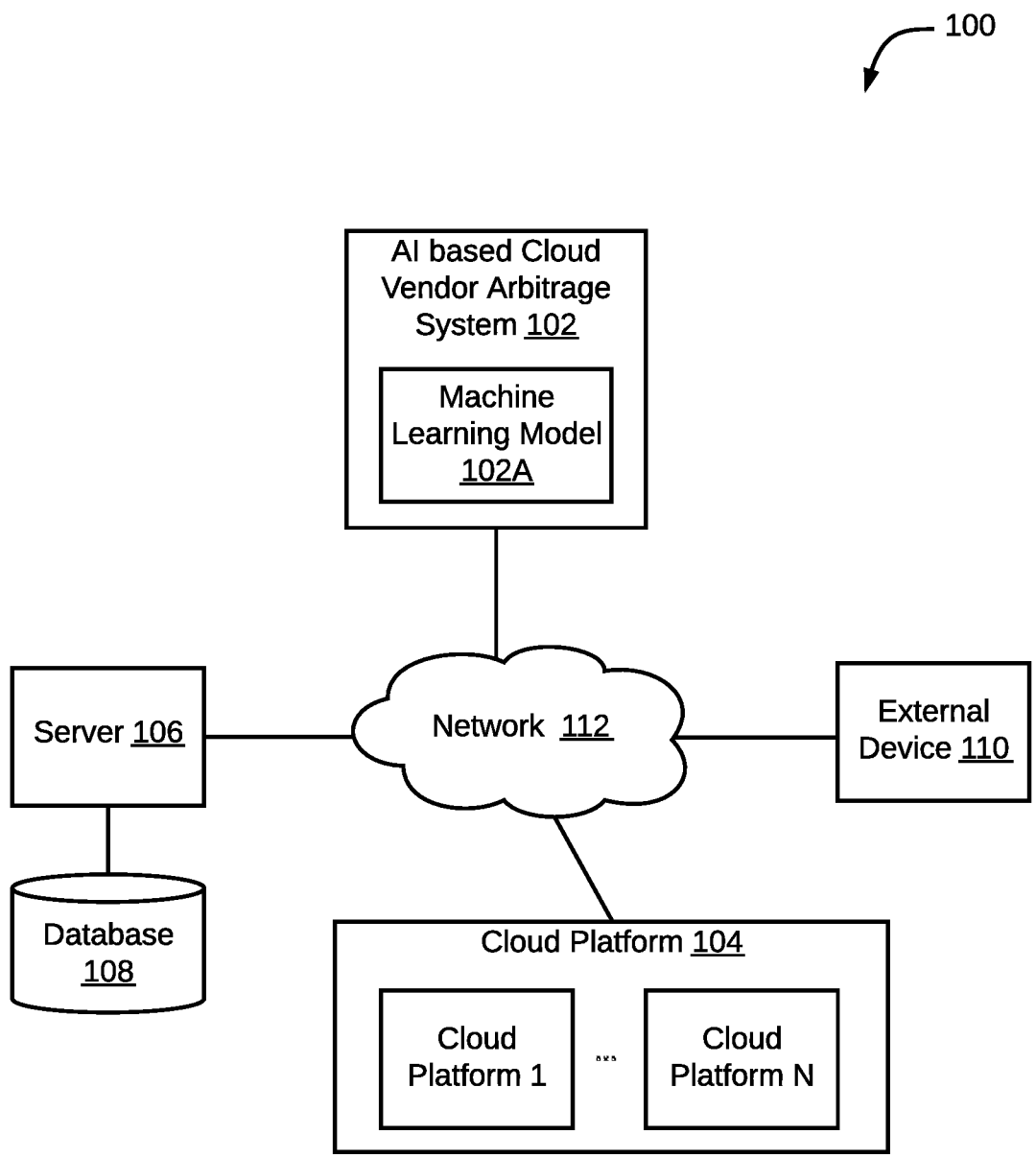
FIG. 1 illustrates a block diagram of an environment of an AI based cloud vendor arbitrage system performing cloud vendor arbitrage using Artificial Intelligence (AI), in accordance with an embodiment.

The following description is presented to enable a person of ordinary skill in the art to make and use the disclosure and is provided in the context of applications and their requirements. Various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art will realize that the disclosure might be practiced without the use of these specific details. In other instances, well-known structures and devices are shown in block diagram form in order not to obscure the description of the disclosure with unnecessary detail. Thus, the disclosure is not intended to be limited to the embodiments shown, but is to be accorded the widest scope consistent with the principles and features disclosed herein.

While the disclosure is described in terms of particular examples and illustrative figures, those of ordinary skill in the art will recognize that the disclosure is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions). Software and firmware can be stored on computer-readable storage media. Some other processes can be implemented using analog circuitry, as is well known to one of ordinary skill in the art. Additionally, memory or other storage, as well as communication components, may be employed in embodiments of the invention.

The present disclosure tackles limitations of existing systems to facilitate performing cloud vendor arbitrage with various cloud vendors, using an AI based cloud vendor arbitrage system. The present disclosure also provides identification of a relevant cloud vendor to whose cloud platform the product or application of an organization associated with the AI based cloud vendor arbitrage system may be deployed or migrated from another cloud vendor. The disclosed AI based cloud vendor arbitrage system may facilitate robust application and infrastructure deployment that can automatically identify to which cloud vendor a particular component or an entire application needs to be deployed. The disclosed AI based cloud vendor arbitrage system may predict future performance of individual components based on previous usage patterns and performance over the cloud. The disclosed AI based cloud vendor arbitrage system may also recommend list of cloud vendors that can be leveraged by cloud SMEs to evaluate and do necessary actions before even actual fatal error in future. The disclosed AI based cloud vendor arbitrage system may help an organization to pro-actively identify performance of various components of an application and pro-actively identify which part of an application may fail in near future.

Further, the present disclosure may facilitate computation of ranks of various cloud vendors. In accordance with an embodiment, the disclosed AI based cloud vendor arbitrage system may be trained by exposing to a new environment during initial training process. These advantages have been explained in detail in conjunction with FIG. 1 to FIG. 13.

Referring now to FIG. 1, a functional block diagram for an environment 100 of an AI based cloud vendor arbitrage system for performing cloud vendor arbitrage using is illustrated, in accordance with an embodiment. With reference to FIG. 1, there is shown an AI based cloud vendor arbitrage system 102, a machine learning (ML) model 102A, a cloud platform 104, a server 106, a database 108, an external device 110, and a communication network 112 (hereinafter referred as a network 112).

The AI based cloud vendor arbitrage system 102 may be communicatively coupled to the cloud platform 104, the server 106 and the external device 110, via the network 112. Further, the AI based cloud vendor arbitrage system 102 may be communicatively coupled to the database 108 of the server 106, via the network 112. A user, a cloud Subject Matter Expert (SME) or an administrator (not shown in the FIG. 1) may interact with the AI based cloud vendor arbitrage system 102 via a user interface.

The AI based cloud vendor arbitrage system 102 may include suitable logic, circuitry, interfaces, and/or code that may be configured to perform cloud vendor arbitrage using each of a plurality of metrices for each of a set of components associated with an application and infrastructure deployment. The plurality of metrices comprise at least one of a component type, a deployment date of a component, a deployment type, an instance type, a number of connections of the component, and a number of users associated with the component.

Examples of the AI based cloud vendor arbitrage system 102 may include, but are not limited to, a server, a desktop, a laptop, a notebook, a tablet, a smartphone, a mobile phone, an application server, or the like. By way of an example, the AI based cloud vendor arbitrage system 102 may be implemented as a plurality of distributed cloud-based resources by use of several technologies that are well known to those skilled in the art. Other examples of implementation of the AI based cloud vendor arbitrage system 102 may include, but are not limited to, a web/cloud server and a media server.

In accordance with an embodiment, the AI based cloud vendor arbitrage system 102 may be configured to deploy the ML model 102A to use output of the ML model to generate real or near-real time inferences, take decisions, or output prediction results. The ML model 102A may be deployed on the AI based cloud vendor arbitrage system 102 once the ML model 102A is trained on the AI based cloud vendor arbitrage system 102.

In accordance with one embodiment, the ML model 102A may correspond to one or more first pre-trained machine learning model. In accordance with an embodiment, a separate AI based model (from one or more first pre-trained machine learning model) may be built corresponding to each of plurality of metrices for each of a set of components associated with an application and infrastructure deployment. In accordance with an embodiment, the one or more first pre-trained machine learning model may correspond to an attention based deep neural network model to emphasize more on one or more of the plurality of metrices (for example, component type and deployment type) that affects performance of the AI based cloud vendor arbitrage system 102. Examples of the attention based deep neural network model includes, but not limited to, Long Short-Term Memory (LSTM), LSTM—GRU (Long Short-Term Memory—Gated Recurrent Units) of Neural Network. The ML model 102A may be configured to determine one or more features for each of the plurality of metrices. The ML model 102A may be configured to determine one or more features in order to assist the AI based cloud vendor arbitrage system 102 to create the one or more feature vectors.

In accordance with another embodiment, the ML model 102A may correspond to a pre-trained second machine learning model. The ML model 102A may be trained to rank each cloud vendor from a plurality of cloud vendors to determine cloud preference from the plurality of cloud vendors.

The cloud platform 104 may include suitable logic, circuitry, interfaces, and/or code that may be configured to provide cloud services from cloud vendors to cloud service users (not shown in FIG. 1) associated with the AI based cloud vendor arbitrage system 102. Examples of the cloud services on the cloud platform 104 may include, but are not limited to, enterprises resource planning services, Infrastructure as-a-Service (IaaS), Platform-as-a-Service (PaaS), Software-as-a-Service (SaaS), and managed services. Infrastructure-as-a-Service (IaaS) may refer to a virtualized computing infrastructure through which cloud services are provided (e.g., virtual server space, network connections, bandwidth, IP addresses, load balancers, etc). Platform-as-a-Service (PaaS) in the cloud may refer to a set of software and product development tools hosted on the cloud for enabling developers (i.e., a type of cloud service consumer) to build applications and services using the cloud. Software-as-a-Service (SaaS) may refer to applications that are hosted on and available on-demand by cloud service consumers via the cloud. Managed Services may refer to services such as backup administration, remote system administration, application management, and security services that are enabled by managed service providers for any Cloud services. Cloud platform 1, cloud platform 2, up to cloud platform N may correspond to different cloud service providers (also referred as cloud vendors).

The server 106 may include suitable logic, circuitry, interfaces, and/or code that may be configured to store, maintain, and execute one or more software platforms and programs, such as AI programs and machine learning programs, data associated with metrices, and one or more databases (such as the database 108) that include, without limitation, historical data, price data for each of a set of components associated with an application and infrastructure deployment from the cloud vendors. Although in FIG. 1, the AI based cloud vendor arbitrage system 102 and the server 106 are shown as two separate entities, this disclosure is not so limited. Accordingly, in some embodiments, the entire functionality of the server 106 may be included in the AI based cloud vendor arbitrage system 102, without a deviation from scope of the disclosure.

The external device 110 may include suitable logic, circuitry, interfaces, and/or code that may be configured to facilitate communication of one or more users with the AI based cloud vendor arbitrage system 102. The external device 110 may be capable of communicating with the AI based cloud vendor arbitrage system 102 via the network 112. The external device 110 and the AI based cloud vendor arbitrage system 102 are generally disparately located. In accordance with an embodiment, the external device 110 may be configured to transmit text-based, voice-based, and/or video-based communications that are stored and executed by the AI based cloud vendor arbitrage system 102 for performing cloud vendor arbitrage.

The functionalities of the external device 110 may be implemented in portable devices, such as a high-speed computing device, and/or non-portable devices, such as an application server. Examples of the external device 110 may include, but are not limited to, a computing device, a smart phone, a mobile device, a laptop, a smart watch, an MP3 player, a personal digital assistant (PDA), an e-reader, and a tablet. In accordance with an embodiment, the AI based cloud vendor arbitrage system 102 may interact with the cloud platform 104, the server 106 or the external device 110 over the network 112 for sending and receiving various types of data.

The network 112 may include a communication medium through which the AI based cloud vendor arbitrage system 102, the cloud platform 104, the server 106, and the external device 110 may communicate with each other. Examples of the network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the network 112, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

In operation, the AI based cloud vendor arbitrage system 102 may be configured to receive each of a plurality of metrices for each of a set of components associated with an application and infrastructure deployment. The AI based cloud vendor arbitrage system 102 may be further configured to determine one or more features for each of the plurality of metrices. The AI based cloud vendor arbitrage system 102 may be further configured to create one or more feature vectors corresponding to each of the plurality of metrices, based on one or more features determined for each of the plurality of metrices. In accordance with an embodiment, the one or more feature vectors may be created based on corresponding one or more first pre-trained machine learning model.

Further, the AI based cloud vendor arbitrage system 102 may assess the one or more feature vectors using corresponding one or more first pre-trained machine learning models. The AI based cloud vendor arbitrage system 102 may then predict a metric value corresponding to each of the plurality of metrices. Thereafter, the AI based cloud vendor arbitrage system 102 may perform the cloud vendor arbitrage by computing prices for each of the set of components from price data received from each of a plurality of cloud vendors, based on the metric value predicted corresponding to each of the plurality of metrices. In accordance with an embodiment, the cloud vendor arbitrage may correspond to comparing of vendor pricing regularly by the AI based cloud vendor arbitrage system 102 to move workloads from an organization to the cloud platform that best meets needs of the organization, with an ultimate goal of saving money.

In accordance with an embodiment, the AI based cloud vendor arbitrage system 102 may be configured to determine a cloud preference from at least one of the plurality of cloud vendors for the application and infrastructure deployment, based on comparison of prices from the computed prices, in response to the performing of the cloud vendor arbitrage. In order to determine the cloud preference, the AI based cloud vendor arbitrage system 102 may compute score for each cloud vendor from the plurality of cloud vendors. Based on the computed score, the AI based cloud vendor arbitrage system 102 may rank each cloud vendor from the plurality of cloud vendors. This is further explained in detail in conjunction with FIG. 2 to FIG. 13.

Figure 2:
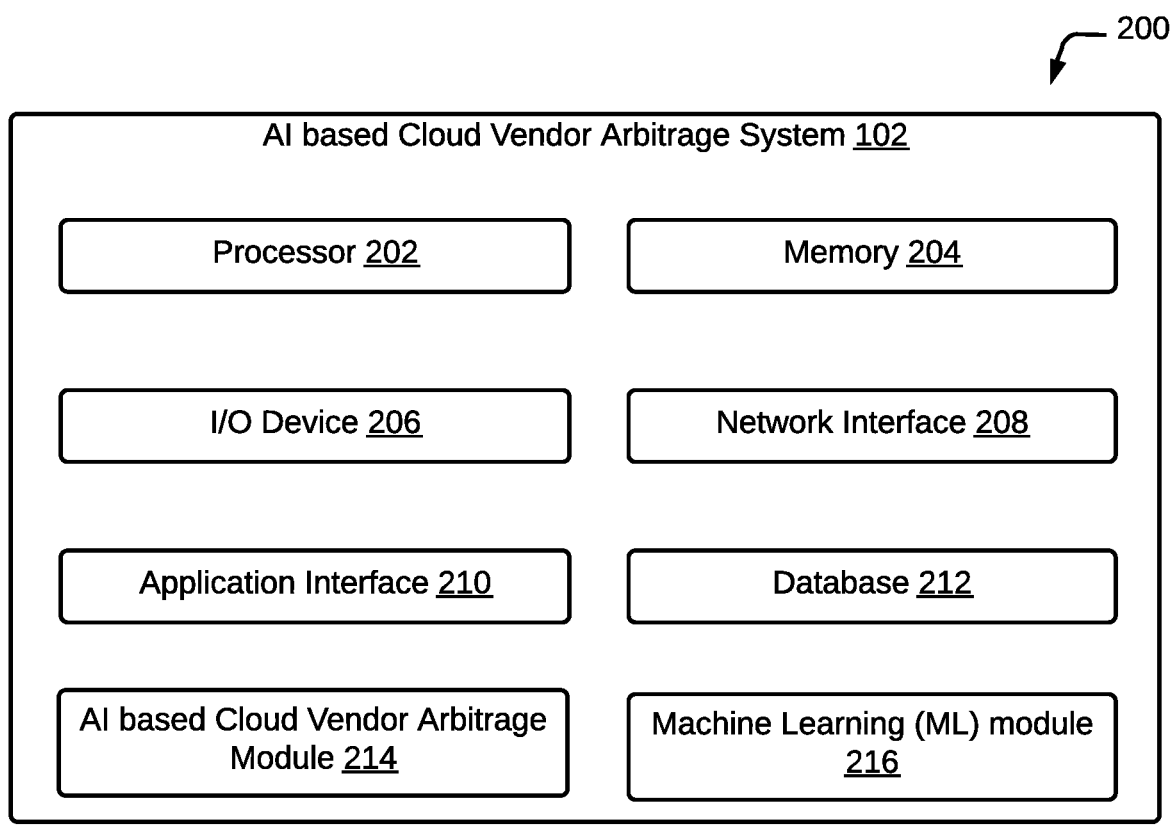
FIG. 2 illustrates a functional block diagram of various modules of an AI based cloud vendor arbitrage system for performing cloud vendor arbitrage using Artificial Intelligence (AI), in accordance with an embodiment.

Referring now to FIG. 2, a functional block diagram of an exemplary AI based cloud vendor arbitrage system for performing cloud vendor arbitrage is illustrated, in accordance with an embodiment of the present disclosure. FIG. 2 is explained in conjunction with FIG. 1.

With reference to FIG. 2, there is shown a functional block diagram 200 of the AI based cloud vendor arbitrage system 102. The AI based cloud vendor arbitrage system 102 may include a processor 202, a memory 204, an input/output (I/O) device 206, a network interface 208, an application interface 210, a database 212, and modules, namely, an AI based cloud vendor arbitrage module 214 and a machine learning (ML) module 216.

The modules 214 and 216 described herein may be implemented as software modules that may be executed in a cloud-based computing environment of the AI based cloud vendor arbitrage system 102.

The ML module 216 of the AI based cloud vendor arbitrage system 102 may include one or more machine learning models (such as, one or more first pre-trained machine learning models, and a second pre-trained machine learning model), as part of, for example, a software application of the AI based cloud vendor arbitrage system 102 for AI based cloud vendor arbitrage system 102. In accordance with an embodiment, the processor 202 may be communicatively coupled to the memory 204, the I/O device 206, the network interface 208, the application interface 210, the database 212, the AI based cloud vendor arbitrage module 214 and the ML module 216.

Elements and features of the AI based cloud vendor arbitrage system 102 may be operatively associated with one another, coupled to one another, or otherwise configured to cooperate with one another as needed to support the desired functionality, as described herein. For ease of illustration and clarity, the various physical, electrical, and logical couplings and interconnections for the elements and the features are not depicted in FIG. 2. Moreover, it should be appreciated that embodiments of AI based cloud vendor arbitrage system 102 will include other elements, modules, and features that cooperate to support the desired functionality. For simplicity, FIG. 2 only depicts certain elements that relate to the techniques described in more detail below.

The processor 202 may include suitable logic, circuitry, interfaces, and/or code that may be configured to process data associated with metrices for each of a set of components associated with an application and infrastructure deployment. In accordance with an embodiment, the processor 202 may determine the cloud preference from at least one of the plurality of cloud vendors for the application and infrastructure deployment. The processor 202 may be implemented based on a number of processor technologies, which may be known to one ordinarily skilled in the art. Examples of implementations of the processor 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof. The processor 202 may be communicatively coupled to, and communicates with, the memory 204.

The memory 204 may include suitable logic, circuitry, and/or interfaces that may be configured to store instructions executable by the processor 202. Additionally, the memory 204 may be configured to store program code of one or more machine learning models and/or the software application that may incorporate the program code of the one or more machine learning models. The memory 204 may be configured to store any received data or generated data associated with storing, maintaining, and executing the AI based cloud vendor arbitrage system 102, such as, but not limited to, the metric value corresponding to each of the plurality of metrices, the one or more feature vectors, ranks for each cloud vendor from the plurality of cloud vendors, and a performance degradation of each of the set of components. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and/or interfaces that may be configured to act as an I/O interface between a user and the AI based cloud vendor arbitrage system 102. The I/O device 206 may further act as an I/O interface between a cloud SME and the AI based cloud vendor arbitrage system 102. The I/O device 206 may include various input and output devices, which may be configured to communicate with different operational components of the AI based cloud vendor arbitrage system 102. The I/O device 206 may be configured to communicate data between the AI based cloud vendor arbitrage system 102 and one or more of the cloud platform 104, the server 106, and the external device 110.

By way of an example, the user may provide inputs, i.e., the plurality of metrices via the I/O device 206. In addition, the I/O device 206 may be configured to provide ranks to the cloud vendors. Further, the I/O device 206 may be configured to display results (such as, ranking each cloud vendor from the plurality of cloud vendors) based on the computed scores by the AI based cloud vendor arbitrage system 102, to the user. In some embodiments, the AI based cloud vendor arbitrage system 102 may ingest the one or more metrices via the I/O devices 206.

Further, for example, in some embodiments, the AI based cloud vendor arbitrage system 102 may render intermediate results (e.g., one or more feature vectors created corresponding to each of the plurality of metrices and one or more features determined for each of the plurality of metrices) or final results (e.g., results of determining of cloud preference from at least one of the plurality of cloud vendors for the application and infrastructure deployment) to the user(s) via the I/O devices 206. The user may correspond to, without limitation, an IT professional and an SME. Examples of the I/O device 206 may include, but are not limited to, a touch screen, a keyboard, a mouse, a joystick, a microphone, and a display screen.

The network interface 208 may include suitable logic, circuitry, interfaces, and/or code that may be configured to facilitate different components of the AI based cloud vendor arbitrage system 102 to communicate with other devices, such as, the cloud platform 104, the server 106 and the external device 110 in the environment 100, via the network 112. The network interface 208 may be configured to implement known technologies to support wired or wireless communication. Components of the network interface 208 may include, but are not limited to an antenna, a radio frequency (RF) transceiver, one or more amplifiers, a tuner, one or more oscillators, a digital signal processor, a coder-decoder (CODEC) chipset, an identity module, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The application interface 210 may be configured as a medium for a user (such as, the cloud SME) to interact with the AI based cloud vendor arbitrage system 102. The application interface 210 may be configured to have a dynamic interface that may change in accordance with preferences set by the user and configuration of the AI based cloud vendor arbitrage system 102. In some embodiments, the application interface 210 may correspond to a user interface of one or more applications installed on the AI based cloud vendor arbitrage system 102. For communications between the AI based cloud vendor arbitrage system 102 and the user (such as, the SME), the application interface 210 may use text application interfaces, audio call application interfaces, and video call application interfaces.

The database 212 may include suitable logic, circuitry, and/or interfaces that may be configured to store program instructions executable by the processor 202, the AI based cloud vendor arbitrage module 214, the ML module 216, operating systems, and/or application-specific information, such as logs and application-specific databases. The database 212 may include a computer-readable storage media for carrying or having computer-executable instructions or data structures stored thereon. Such computer-readable storage media may include any available media that may be accessed by a general-purpose or special-purpose computer, such as the processor 202, the AI based cloud vendor arbitrage module 214 and the ML module 216.

The database 212 may store data associated with, without limitation, metrices, data for determining interdependence among the plurality of metrices, ranking data, training data associated with machine learning model 102A. The database 212 may generally be stored in the memory 204, and may be accessed and searched by the AI based cloud vendor arbitrage module 214. The database 212 may serve as a repository for storing data processed, received, and generated by the modules 214-216. The data generated as a result of the execution of the modules 214-216 may be stored in the database 212.

By way of an example, and not limitation, the database 212 may use computer-readable storage media that includes tangible or non-transitory computer-readable storage media including, but not limited to, Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

The AI based cloud vendor arbitrage module 214 may include suitable logic, circuitry, and/or interfaces that may be configured to determine cloud preference from at least one of the plurality of cloud vendors for the application and infrastructure deployment, based on comparison of prices from the computed prices. The AI based cloud vendor arbitrage module 214 may be configured to perform correlation analysis among the plurality of metrices for determining interdependence among the plurality of metrices. The AI based cloud vendor arbitrage module 214 may be configured to predict a second metric value using a first metric value predicted from the plurality of metrices. The AI based cloud vendor arbitrage module 214 may be configured to predict a performance degradation of each of the set of components using a survival analysis technique, based on the historical metrices data and the predicted metric value corresponding to each of the plurality of metrices.

The machine learning (ML) module 216 may include suitable logic, circuitry, and/or interfaces that may be configured to create one or more feature vectors corresponding to each of the plurality of metrices by determining one or more features for each of the plurality of metrices and ranking each cloud vendor from the plurality of cloud vendors for cloud preference for an organization. The machine learning module 216 may use one or more first pre-trained machine learning models for prediction of metrices values, such as, but not limited to, Long-Short-Term-Memory (LSTM) based models and Gated Recurring Units (GRU) based models. The machine learning module 216 may also use the second pre-trained machine learning model that correspond to, but not limited to, a graph based neural network model and a ranking based machine learning model (such as, Rank Net).

The ML module 216 may facilitate progressive performance improvement of the AI based cloud vendor arbitrage system 102. This is typically performed by examining output data based on input data to determine the effect of the input data on the output data. Thereafter, various algorithms associated with machine learning models (such as, the first pre-trained machine learning model, and the second pre-trained machine learning model) may adjust the processing of the input data to result in desired output data.

In practice, the AI based cloud vendor arbitrage module 214, the machine learning module 216, and/or the application interface 210 may be implemented with (or cooperate with) the at least one processor 202 to perform at least some of the functions and operations described in more detail herein. In this regard the AI based cloud vendor arbitrage module 214, the machine learning module 216, and/or the application interface 210 may be realized as suitably written processing logic, application program code, or the like.

During operation, the AI based cloud vendor arbitrage module 214 may be configured to receive the plurality of metrices for each of a set of components associated with an application and infrastructure deployment as input data. The plurality of metrices may include, but is not limited to, at least one of at least one of a component type, a deployment date of a component, a deployment type, an instance type, a number of connections of the component, a number of users associated with the component, positive feedback data, negative feedback data of each of the plurality of cloud vendors.

The AI based cloud vendor arbitrage module 214 may be configured to pre-process the input data of the plurality of metrices with ordinal values and nominal values into numerical values. For example, the metrics corresponding to deployment type may be HA and non-HA which is converted to [1 0] and [0 1] respectively by the AI based cloud vendor arbitrage module 214.

In accordance with an embodiment, the input data of the plurality of metrices with numerical values may be converted into a passable format for the one or more first pre-trained machine learning models by using one hot representation for the input data 202. The one hot representation (also known as one hot embedding) may map input data 202 which may be a categorical value data into a Neural Network passable format. Such format may allow to train an embedding layer of the first pre-trained machine learning model for each of the plurality of metrices. The one hot representation may represent a low dimensional embedding which on being fed to hidden layers of the first pre-trained machine learning model can handle a much smaller size of preprocessed input data as compared to the input data with numerical values.

Further, the ML module 216 may be configured to determine one or more features for each of the plurality of metrices corresponding to the pre-processed input data. In accordance with an embodiment, the ML module 216 may be configured to determine one or more features for each of the plurality of metrices based on the corresponding one or more first pre-trained machine learning models. As will be appreciated, the one or more first pre-trained machine learning models may correspond to a deep neural network model (for example, an attention based deep neural network model and a Convolution Neural Network (CNN) model).

In accordance with an embodiment, the ML module 216 may be further configured to create one or more feature vectors corresponding to the determined one or more features. In accordance with another embodiment, the ML module 216 may be configured to create one or more feature vectors corresponding to each of the plurality of metrices based on the first one or more pre-trained machine learning model. The feature vectors created for each of the plurality of metrices may be stored in the database 212 for further computation. It may be noted that the process of storing the feature vectors in the database 212 may continue, until the feature vector corresponding to each of the plurality of metrices is created and stored.

In accordance with an embodiment, the ML module 216 may be configured to assess each of the one or more feature vectors. In an embodiment, the ML module 216 may assess each of the one or more feature vectors, based on the first pre-trained machine learning model.

The ML module 216 may be further configured to predict a metric value corresponding to each of the plurality of metrices, based on the assessment of each of the one or more feature vectors. Further, the ML module 216 may be configured to transmit a result of prediction of the metrices values to the AI based cloud vendor arbitrage module 214.

The AI based cloud vendor arbitrage module 214 may be configured to receive the result of prediction from the ML module 212. Further, the AI based cloud vendor arbitrage module 214 may be configured to compute prices for each of the set of components from price data received from each of a plurality of cloud vendors. The AI based cloud vendor arbitrage module 214 may be configured to perform the cloud vendor arbitrage and determine a cloud preference from at least one of the plurality of cloud vendors for the application and infrastructure deployment, based on comparison of prices from the computed prices, in response to the performing of the cloud vendor arbitrage. In accordance with an embodiment, output data corresponding to the computed prices for each of the set of components and the cloud preference may be rendered on the external device 110.

In order to determine the cloud preference, the ML module 216 may be configured to compute ranks for each cloud vendor from the plurality of cloud vendors for cloud preference. In an embodiment, the ML module 216 may compute ranks using the second pre-trained machine learning model. In accordance with an embodiment, the second pre-trained machine learning model may correspond to a ranking based neural network model (for example, Rank net).

In particular, as will be appreciated by those of ordinary skill in the art, the modules 214-216 for performing the techniques and steps described herein may be implemented in the AI based cloud vendor arbitrage system 102, either by hardware, software, or combinations of hardware and software. For example, suitable code may be accessed and executed by the one or more processors on the AI based cloud vendor arbitrage system 102 to perform some or all of the techniques described herein. Similarly, application specific integrated circuits (ASICs) configured to perform some or all of the processes described herein may be included in the one or more processors on the host computing system. Even though FIGS. 1-2 describe about the AI based cloud vendor arbitrage system 102, the functionality of the components of the AI based cloud vendor arbitrage system 102 may be implemented in any computing devices.

Referring now to FIG. 3A-3B, tabular representations of input data corresponding to the plurality of metrices is illustrated, in accordance with some exemplary embodiments of the present disclosure. FIGS. 3A-3B are explained in conjunction with FIG. 1 to FIG. 2.

With reference to FIG. 3A, the tabular representation 300A of a dataset (the input data) corresponding to the plurality of metrices for each of a set of components associated with an application and infrastructure deployment is shown. The dataset may depict the plurality of metrices captured or received as the input data by the AI based cloud vendor arbitrage system 102 for each of a set of components associated with an application and infrastructure deployment in order to perform cloud vendor arbitrage from various cloud vendors.

The dataset in the tabular representation 300A includes component identifier (ID), component name, component type, date, deployment type, instance type, number of connections, and number of users. Typically, an application or infrastructure may generally be made up of multiple components. For example, an application requires components, such as, but not limited to, a web server, a database server, a monitoring solution, a logging service, and a dashboard (if required). Therefore, the AI based cloud vendor arbitrage system 102 may predict future performance of individual components, based on previous usage patterns and performance over the cloud. In accordance with an embodiment, a usage pattern and performance related data may be being captured from a monitoring system that regularly monitors deployed applications or infrastructure. In accordance with an embodiment, the AI based cloud vendor arbitrage system 102 may leverage such data in a dataset shown in FIG. 3A.

Referring to FIG. 3A, in tabular representation 300A, data is collected for "MS SQL server" component that includes type of component, date when metric value for the component may be calculated, deployment type, and instance type. In some embodiment, the AI based cloud vendor arbitrage system 102 may have more features or parameters. The dataset in 300A may be used to forecast performance of a particular component (e.g., MS SQL Server) based on usage patterns or performance of application or infrastructure over a period of time.

In accordance with another embodiment, data related to any component can be collected or captured from monitoring systems, depending on components being deployed for the application or infrastructure. The "component type" may take value depending on type of components for which data is being collected. For example, for any database component, the "component type" may be database only. The "deployment type" can take values as High Availability (HA), Disaster Recovery (DR) or non-HA, depending on level of availability of whether the application is required or not. The "instance type" corresponds to a type of instance that has been provisioned for a component by cloud vendor, as per requirement of an organization. As shown in tabular representation 300A, the features or columns may correspond to categorical columns. In accordance with an embodiment, metrices, such as, a number of connections and a number of users may represent performance of components over a period of time. Since metrices, such as, the number of connections may affect a selection of the "instance type" where the component may be deployed and therefore, the overall cost. Therefore, the AI based cloud vendor arbitrage system 102 may first forecast values of various metrics, such as, but not limited to, the number of connections, and the number of users as per the deployed components. Based on predicted metrices values, the AI based cloud vendor arbitrage system 102 may connect with any of cloud vendors on the cloud platform 104 to find out pricing of the components and provide suggestion to Subject Matter Experts (SMEs) accordingly.

The dataset populated in the table 300A may not be suitable as a passable format for a neural network, such as one or more first pre-trained machine learning models. Hence, the dataset populated in the table 300A may be pre-processed by the AI based cloud vendor arbitrage system 102 as shown in FIG. 3B.

The tabular representation 300B may represent numerical values of the plurality of metrices captured or received for each of the set of components. The AI based cloud vendor arbitrage system 102 may be configured to convert input data (categorical features or columns) of ordinal or nominal values as shown in FIG. 3A into numerical values.

With reference to tabular representation 300B, the column "deployment type" (named as D1 and D2) may have values, such as, 1 and 2. HA may be replaced by 1 and non-HA may be replaced by 2. Similarly, the columns "component type" (named as C1), "instance type" (named as I1 and I2) may be converted into the numerical values. In accordance with another embodiment, the categorical features can also be represented as one hot encoding where new features may be created, and number of such features may be less than or equal to the number of unique values present in the feature that has to be converted.

In one hot representation, each value (such as, HA) may have a vector representation where the number of dimensions may be less than or equal to the number of unique values in the column. In accordance with an embodiment, new features may be added, one for each value of an existing or new column. By way of an example, "HA" may be represented as [1 0] and the "non-HA" column may be represented as [0 1]. The "Date" field can be converted as per requirement. For example, date can be converted to represent only week specific value and data for component may be aggregated to represent as single data point. Thereafter, a separate AI based model may be built corresponding to each of plurality of metrices for each of a set of components associated with an application and infrastructure deployment as explained in conjunction with FIG. 3C.

Figure 3C:
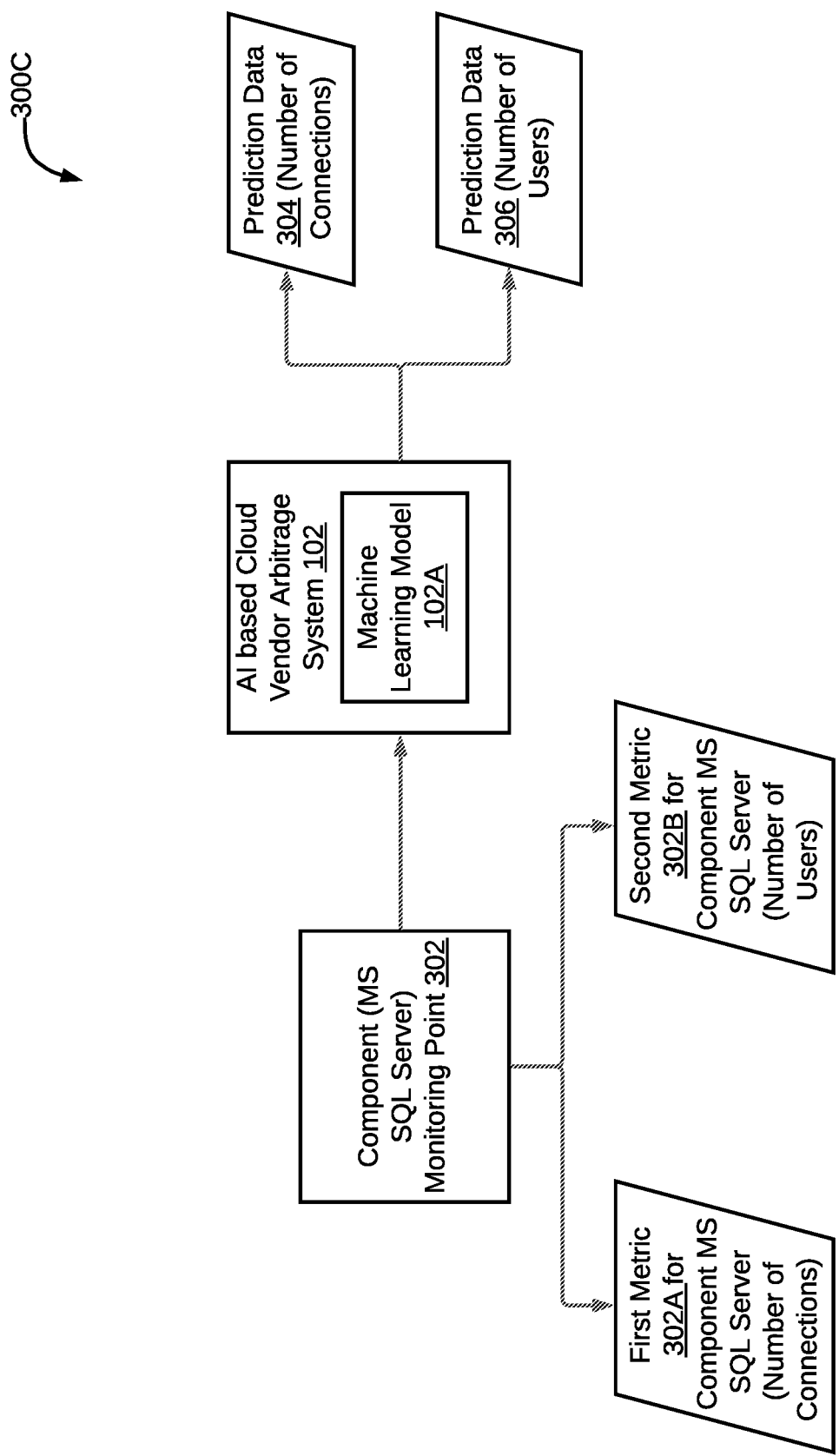
FIG. 3C illustrates a block diagram of an AI based cloud vendor arbitrage system for predicting metrices values, in accordance with an exemplary embodiment.

FIG. 3C illustrates a block diagram 300C of an AI based cloud vendor arbitrage system for predicting metrices values, in accordance with some exemplary embodiments. There is shown a component monitoring point 302, a first metric 302A corresponding to a number of connections for a component-MS SQL Server, a second metric 302B corresponding to a number of users for the component-MS SQL Server, prediction data 304 for the first metric 302, and prediction data 306 for the second metric 302B. For the sake of brevity, two metrices, viz., the first metric 302A and the second metric 302B for one component (that is, MS SQL Server) are illustrated for prediction of data. However, in accordance with another embodiment, a plurality of metrices for each of a set of components may be used, without deviating from the scope of the present disclosure.

In accordance with an embodiment, the AI based cloud vendor arbitrage system 102 may use an attention based deep learning recurrent neural network, such as, but not limited to, a Long Short-Term Memory (LSTM), a Long Short-Term Memory—Gated Recurrent Units (LSTM—GRU), a Long Short-Term Memory—Convolution Neural Network (LSTM—CNN) to take the processed form of the input data from the component monitoring point 302 as shown in 300B and predict values of each of the plurality of metrices (such as, the first metric value 302A and the second metric value 302B). However, architecture of neural network model (such as, the machine learning model 102A) for predicting each of the plurality of metrices values may be dependent on the metric value to be predicted. The AI based cloud vendor arbitrage system 102 may use an attention mechanism in the neural network model to emphasize more on some of the metrices values from the plurality of metrices values. By way of an example, the component type and the deployment type are main factors that affect performance of systems where the application or infrastructure is deployed. Therefore, in accordance with an embodiment, the AI based cloud vendor arbitrage system 102 may focus more on the "component type" and the "deployment type" metrices values.

In some embodiment, a number of machine learning models to be generated may be equal to the number of metrics to be predicted. Additionally, in some embodiments, the number of machine learning models can be larger when predicted value of one of the metrices is utilized for predicting another metric value. The AI based cloud vendor arbitrage system 102 may be configured to calculate interdependence among the metrices by performing correlation analysis amongst the plurality of metrices. Such calculated interdependence among the metrices may enable a data scientist to find out which metric value has to be predicted first and how to use the predicted metric value to predict value for another metric. By way of an example, the prediction data 304 corresponding to the number of connections may be computed first and then the prediction data 306 corresponding to the number of users may be computed.

Figure 4A:
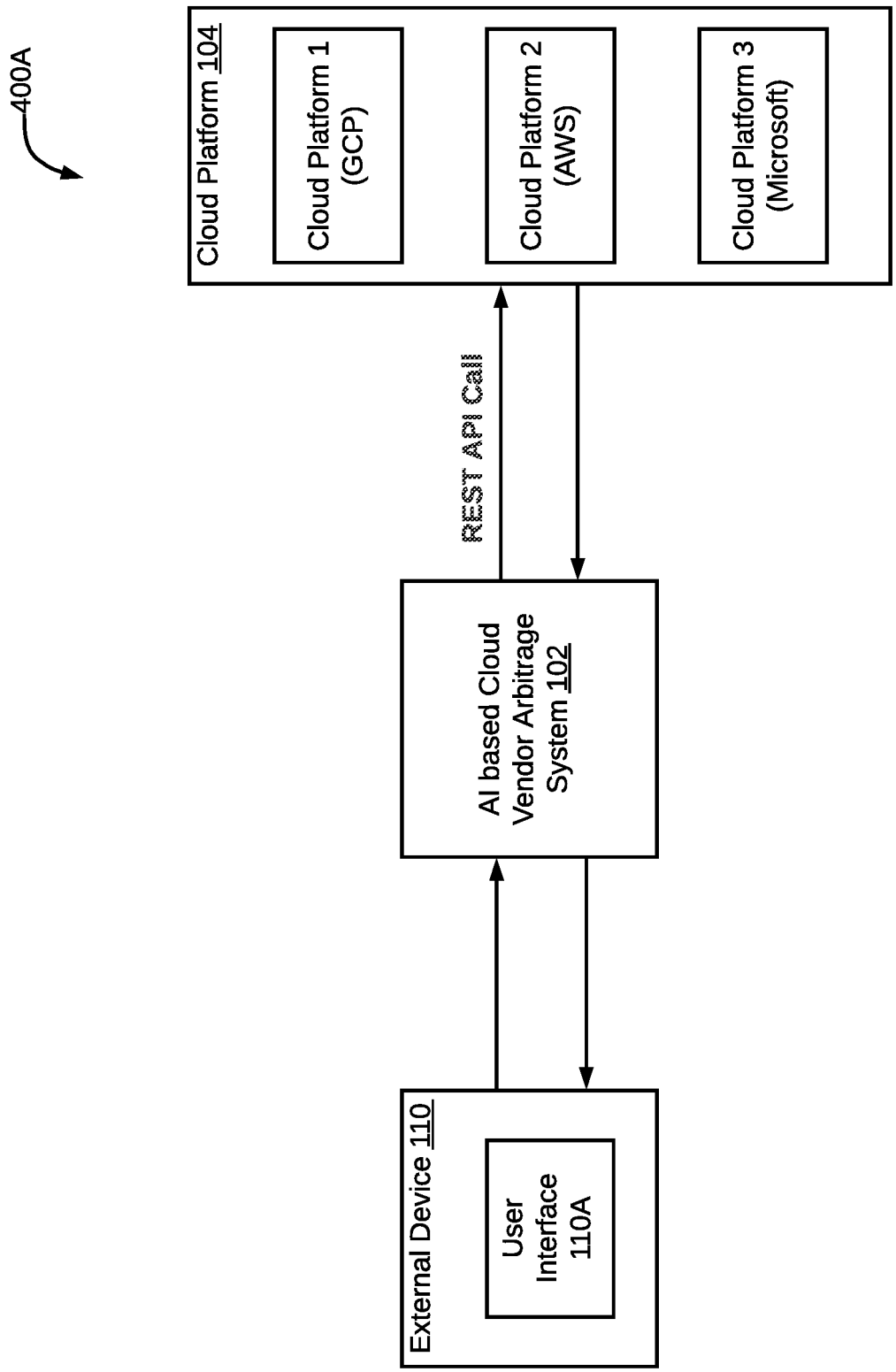
FIG. 4A-4B collectively illustrate block diagrams of computing prices for each component from price data received from each cloud vendor using an AI based cloud vendor arbitrage system, in accordance with an exemplary embodiment.
Figure 4B:
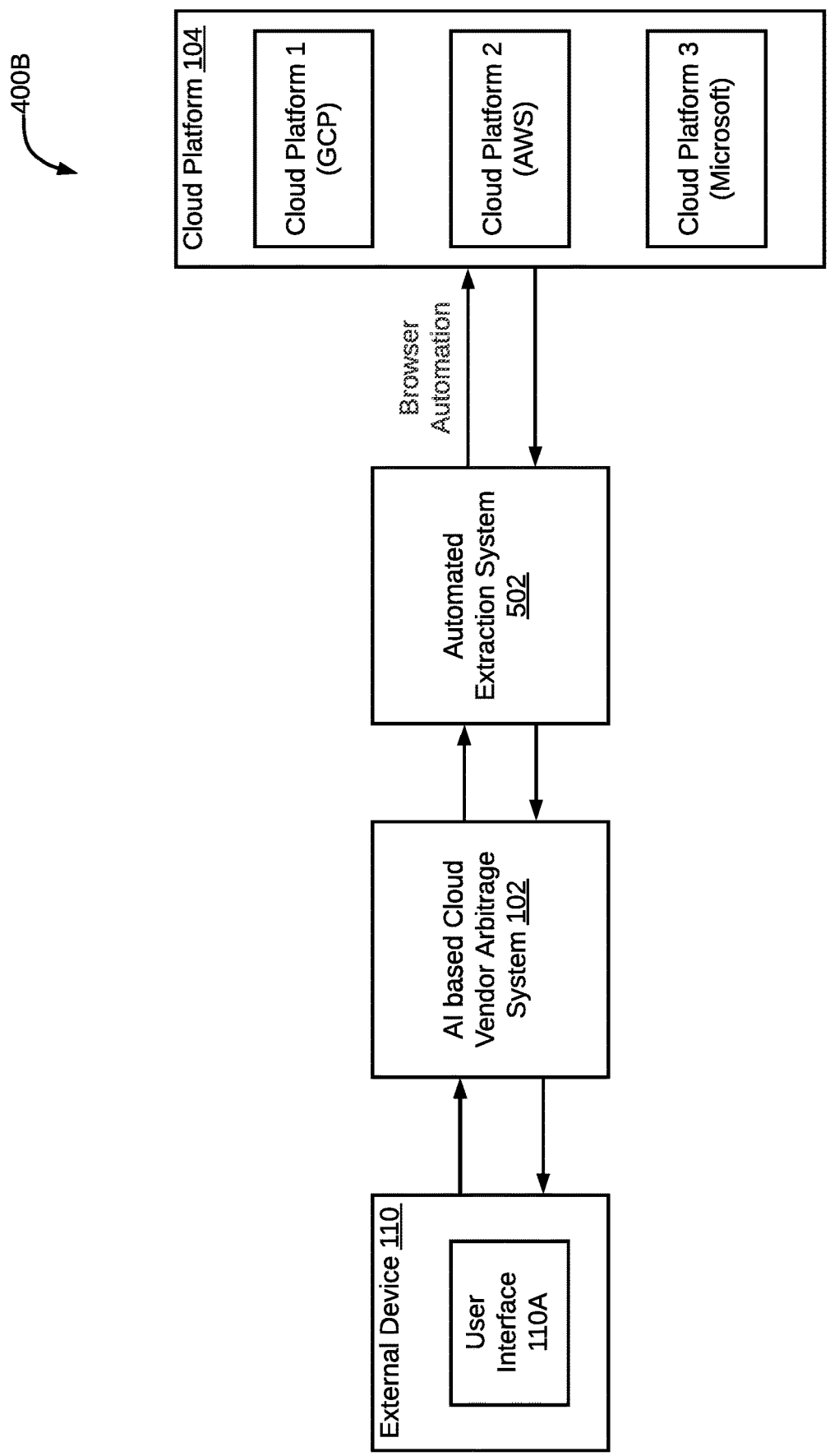

FIG. 4A-4B collectively illustrate block diagrams of computing prices for each component from price data received from each cloud vendor using an AI based cloud vendor arbitrage system, in accordance with some exemplary embodiments. FIGS. 4A-4B are explained in conjunction with FIG. 1 to FIG. 3C.

With reference to FIG. 4A, the AI based cloud vendor arbitrage system 102 may connect with a catalogue of any of the cloud platforms (or cloud vendors) for computing pricing for each component via Representational State Transfer Application Programming Interface (REST API) provided by each of the cloud vendor as price data. In accordance with an embodiment, the information in catalogue of any of the cloud platforms for computing price may also be referred as price data. In accordance with an embodiment, the cloud platform 104 may include cloud platform 1, cloud platform 2 and cloud platform 3. Examples of the cloud platform 104 may include such as, but not limited to, Google Cloud Platform (GCP), Amazon Web Services (AWS), and Microsoft.

With reference to FIG. 4B, the AI based cloud vendor arbitrage system 102 may implement an automated extraction system 502 when a cloud vendor does not provide access to a price catalogue. In accordance with an embodiment, the automated extraction system 502 integrated with the AI based cloud vendor arbitrage system 102 may access the price catalogue of the cloud vendor via a browser for computing prices for each component as required.

FIG. 5 illustrates a tabular representation 500 of exemplary input data corresponding to the plurality of metrices for re-ranking cloud vendors, in accordance with some exemplary embodiments. FIG. 5 is explained in conjunction with FIG. 1 to FIG. 4B.

With implementation explained in description of FIG. 4A-4B, the SMEs may be able to determine which cloud vendor to be preferred for application deployment or infrastructure readiness. However, it may be possible that SMEs may require more metrics to be covered as part of cloud vendor arbitrage process or alternatively, not satisfied with recommendations generated by the AI based cloud vendor arbitrage system 102. In such a case, the AI based cloud vendor arbitrage system 102 may be configured to implement neural network based ranking methodology to rank raw recommendations provided by AI based cloud vendor arbitrage system 102.

Dataset in the tabular representation 500 includes component ID, component name, recommended cloud vendor, a number of positive feedbacks, and a number of negative feedbacks.

Initially, for the component "MS SQL Server", the recommended cloud vendor may correspond to "AWS" for use. However, SMEs may have preference over another cloud vendor (for example, GCP) due to various reasons. Such reasons may include organization policies and security. In such a case, the AI based cloud vendor arbitrage system 102 may be configured to capture feedback from SMEs and re-rank recommendation of same component type in future. In accordance with an embodiment, the AI based cloud vendor arbitrage system 102 may be configured to recommend list of various cloud vendors and provide list as per various factors of relevancy. In accordance with an embodiment, pre-processing approaches may also be used over columns or features and then processed form of each data point corresponding to each component may be sent to the neural network model based ranking model (e.g., Ranknet).

In accordance with an embodiment, the AI based cloud vendor arbitrage system 102 may be configured to compute a score for each cloud vendor from the plurality of cloud vendors for a corresponding component from the set of components, based on a pre-trained second machine learning model. In accordance with an embodiment, the AI based cloud vendor arbitrage system 102 may be configured to rank each cloud vendor from the plurality of cloud vendors, based on the computed scores, for determining the cloud preference from the plurality of cloud vendors.

In accordance with an embodiment, initially cloud vendors can be ranked on basis of number of positive feedbacks or number of negative feedbacks received over period of time. By way of an example, in tabular representation 500, for MS SQL Server with component ID 3, the number of positive feedbacks is highest as compared to component ID 1 and 2. The number of negative feedbacks is highest for component ID 1. component ID 2 and 3 have not received any number of negative feedback but rather only positive feedback. Therefore, cloud vendor "GCP" may be ranked highest than other cloud vendor, namely "AWS".

In some embodiments, the number of positive feedbacks and the number of negative feedbacks may be combined together using machine learning methods, but not limited to, Regression, and LSTM to generate a single value that includes both of the features corresponding to negative feedbacks and positive feedbacks In some embodiments, the AI based cloud vendor arbitrage system 102 may also capture neutral feedback data, that is, a feedback that cannot be categorized into a positive feedback and a negative feedback. For example, 'Okay' can be considered as neutral feedback which doesn't signify the positive feedback and the negative feedback.

In accordance with an embodiment, determination of cloud preference from several cloud vendors may be used in scenarios where SMEs may see list of relevant cloud vendors over different factors. In some embodiment, the AI based cloud vendor arbitrage system 102 can also train independent ranking system for each of reason type. For example, a separate model for reason type 'security perspective' can be built for individual components.

The AI based cloud vendor arbitrage system 102 may be configured to render output data on the external device 110 based on determination of the cloud preference from several cloud vendors.

In certain other scenario, a cloud SME may leverage the AI based cloud vendor arbitrage system 102. By way of an example, the cloud SME may ask query like "Can you help me with cost estimates of MS SQL Server for my application?" via the I/O devices 206 of the AI based cloud vendor arbitrage system 102.

The AI based cloud vendor arbitrage system 102 may be integrated with a conversation system where it would prompt the cloud SME with a form which is pre-populated with required information for each component and would ask if the cloud SMEs is willing to change any value. As soon as the cloud SME confirms, it will make REST API call for fetching details of price data of each of the cloud vendors to calculate compute cost for each component and populate them as per their relevancy to the cloud SME. In accordance with an embodiment, the AI based cloud vendor arbitrage system 102 may render/display the response using the I/O devices 206.

Figure 6:
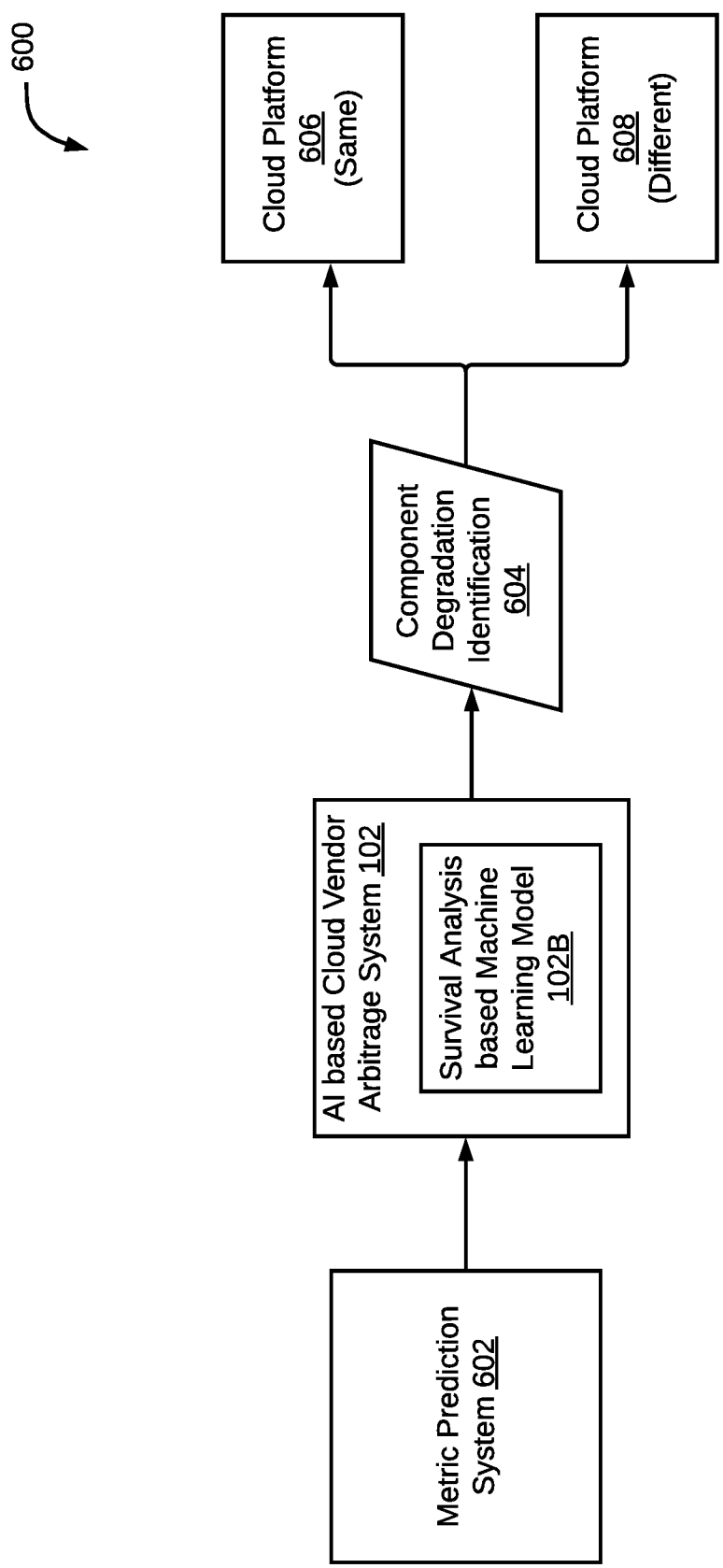
FIG. 6 illustrates a block diagram 600 for predicting a performance degradation of each of the set of components using an AI based cloud vendor arbitrage system, in accordance with an exemplary embodiment.

FIG. 6 illustrates a block diagram 600 for predicting a performance degradation of each of the set of components using an AI based cloud vendor arbitrage system, in accordance with an exemplary embodiment. FIG. 6 is explained in conjunction with FIG. 1 to FIG. 5.

There is shown a metric prediction system 602, the AI based cloud vendor arbitrage system 102 that includes a survival analysis-based machine learning model 102B, component degradation identification 604, a cloud platform 606, and a cloud platform 608. In accordance with an embodiment, the metric prediction system 602 may be a part of the AI based cloud vendor arbitrage system 102.

Generally, it may be difficult to predict how much time will it take for a particular component to fail because that may require continuous monitoring of an environment to find out chances of failure. In accordance with an embodiment, the AI based cloud vendor arbitrage system 102 may be configured to determine a performance degradation of deployed components over a period of time. Therefore, cloud SMEs can take decision accordingly, based on the performance degradation of deployed components.

In accordance with an embodiment, the AI based cloud vendor arbitrage system 102 may be configured to model the degradation of deployed components to determine point of failure and then use the information to alert the cloud SMEs for necessary actions. This is required to avoid unnecessary cost implications on organizations.

In some embodiments, the AI based cloud vendor arbitrage system 102 may use information of model degradation of deployed components to forecast components' metrices values over a period of time (that is, weekly, monthly, quarterly or yearly), based on historical data. To forecast the components' metrices values over the period of time, the AI based cloud vendor arbitrage system 102 may use survival analysis technique to model the degradation process based on predicted values and actual values to predict chances of failure of components. In some embodiments, the AI based cloud vendor arbitrage system 102 can also recommend list of cloud vendors that can be leveraged by the cloud SMEs to evaluate and do necessary actions before even actual fatal error in future. For example, a different cloud platform 608 may be selected instead of the same cloud platform 606 to avoid fatal error in future.

In accordance with an embodiment, the AI based cloud vendor arbitrage system 102 can implement any survival analysis technique, such as, but not limited to, parametric, non-parametric or semi-parametric survival analysis technique. In some cases, survival analysis technique can also leverage evaluation methods, such as, but not limited to, Chi-square test, and log rank test for comparison amongst different methods of survival analysis.

Figure 7:
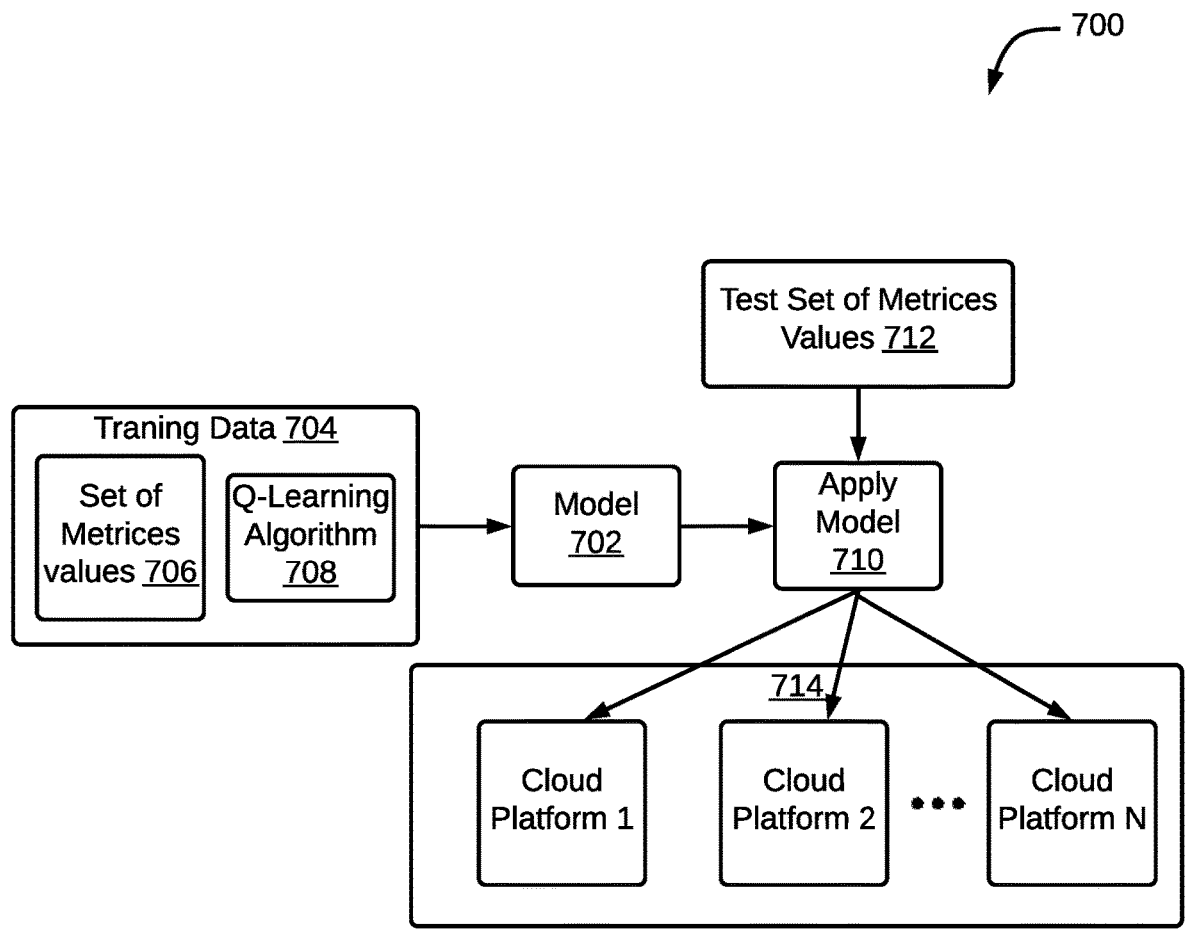
FIG. 7 illustrates an AI based cloud vendor arbitrage system trained on a reinforcement learning approach, in accordance with an exemplary embodiment.

FIG. 7 illustrates an AI based cloud vendor arbitrage system trained on a reinforcement learning approach, in accordance with an exemplary embodiment. FIG. 7 is explained in conjunction with FIG. 1 to FIG. 6.

There is shown a model 702, training data 704 with a set of metrices values 706 and Q-learning algorithm 708, apply model 710, a test set of metrices values 712, and cloud platform ratings 714. In accordance with an embodiment, the model 702 may correspond to a trained cloud vendor arbitrage system, such as the AI based cloud vendor arbitrage system 102. In accordance with an embodiment, the model 702 may be exposed to new training data 704 when the model 702 has never been through earlier training process. The model 702 may leverage any time-based prediction system to generate values for various metrices and may be done for different types of components (software or infrastructure).

As a result, the model 702 may learn to identify optimal reward function that will maximize reward for end goal. In accordance with an embodiment, the set of metrices values 706 may correspond to information associated with each of the set of components. Further, the Q-Learning algorithm 708 (such as, but not limited to, temporal difference algorithm) may be used to calculate a Q-value corresponding to each of the set of components to which metrices values may be provided randomly. The Q-value may be calculated based on the reinforcement learning approach. In addition, the feedback associated with each of the set of metrices values may be predicted based on reinforcement learning approach.

In an embodiment, the Q-value represents each of the set of components corresponding to each of the plurality of metrices using a reinforcement learning algorithm. In accordance with an embodiment, the Q value corresponds to a probability of one cloud vendor from the plurality of cloud vendors being preferred over other cloud vendors from the plurality of cloud vendors. Based on the calculated Q-value, the model 702 may penalize when one of the components may be deployed or utilized inefficiently over one cloud platform than the other. Moreover, the Q-values of each of the set of components along with the preference may be used to maximize reward. If that is not true, then the trained AI based cloud vendor arbitrage system may be penalized.

Based on the training data received, the model 702 may be generated or trained. Such trained model (referred as the model 702) may be applied over a test set of metrices values 712 via the apply model 710. The rating provided to each of the test set of metrices values may be depicted as cloud platform rating 714 (or cloud vendor rating). In accordance with an embodiment, the one or more first pre-trained machine learning models may correspond to a Q network. The Q network may be configured to receive as input an input observation and an input action and to generate an estimated future reward (or penalty) from the input in accordance with each of the plurality of metrices associated with the components.

Figure 8:
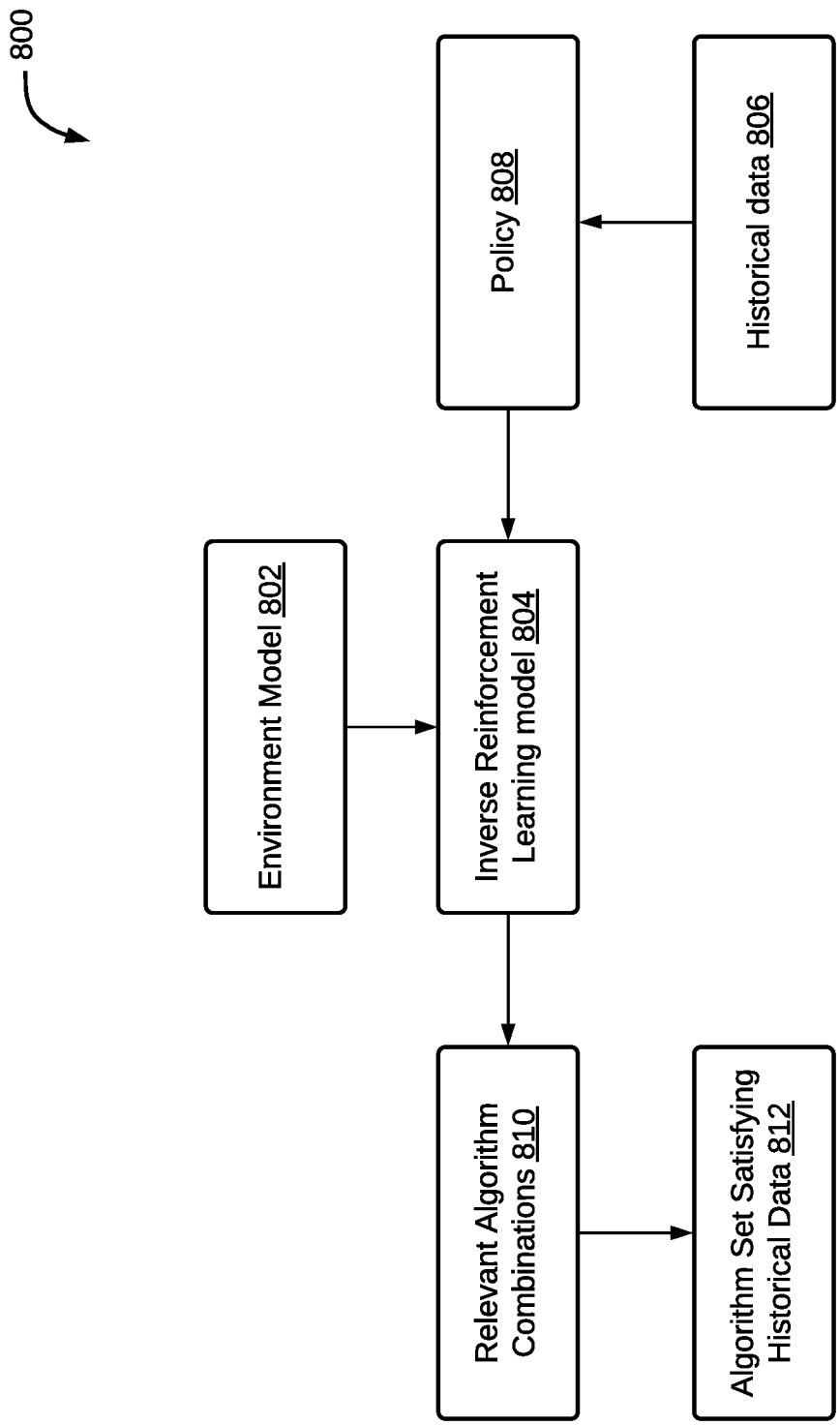
FIG. 8 illustrates an AI based cloud vendor arbitrage system that uses inverse reinforcement learning to predict a set of algorithms to perform hyperparameter tuning, in accordance with an exemplary embodiment.

Referring now to FIG. 8, a trained AI based cloud vendor arbitrage system that uses inverse reinforcement learning is illustrated, in accordance with an exemplary embodiment. FIG. 8 is explained in conjunction with FIG. 1 to FIG. 7. There is shown an environmental model 802, an inverse reinforcement learning model 804, historical data 806, policy 808, relevant algorithm combinations 810, and algorithm set satisfying historical data 812.

The reinforcement learning based trained cloud vendor arbitrage system may correspond to the environment model 802. The environment model 802 may correspond to the apply model 710. The environment model 802 may employ the inverse reinforcement learning model 804. The inverse reinforcement learning model 804 may be configured to utilize the historical records 806 that includes information associated with each of the components (software or infrastructure component) from various applications or infrastructure that has been deployed previously over various cloud platforms.

Thereafter, the inverse reinforcement learning model 504 may identify combination or set of algorithms and function that will define architecture of deep learning based recurrent neural network variations and define hyperparameter for different layers of a neural network. The combination or set of algorithms and function may be represented as relevant algorithm combination 810. In an embodiment, the inverse reinforcement learning model 804 may recommend more than one combination of set of algorithms and functions.

Further, the recommended combination of set of algorithms and functions may be evaluated based on the reinforcement learning approach in order to accept one combination of set of algorithms and functions. Moreover, one combination of set of algorithms and functions may be accepted when it satisfies evaluation of historical records represented as algorithm set satisfying historical records 812. Once the one combination of set of algorithms and functions is accepted, a new environment may be created for the environment model 802.

In addition, the inverse reinforcement learning model 804 may recommend optimal values of hyperparameters corresponding to each combination of set of algorithms and functions. Further, a machine learning model trained over optimal values of hyperparameters may be validated against historical data received from an existing environment of the environment model 802. This process is known as model hyperparameter tuning. In accordance with an embodiment, the trained AI based cloud vendor arbitrage system may select algorithm combination that provides an optimal architecture of a neural network, a recurrent neural network (RNN) architecture and a ranking based neural network architecture to rank cloud platform as per relevancy.

Figure 9:
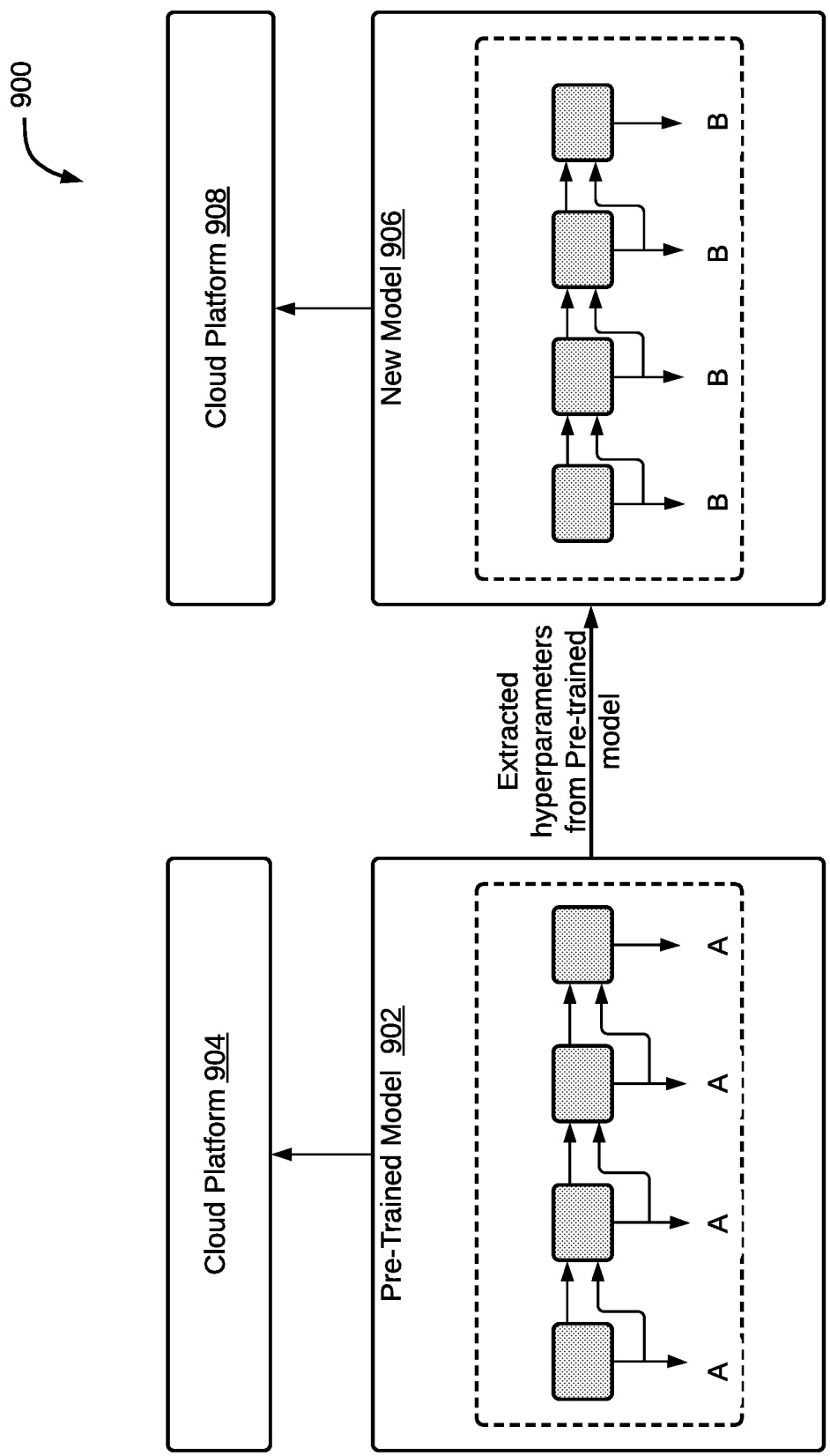
FIG. 9 illustrates creating a new environment for an AI based cloud vendor arbitrage system with a transfer learning approach, in accordance with an exemplary embodiment.

Referring now to FIG. 9, a transfer learning approach to create a new environment for a trained AI based cloud vendor arbitrage system is depicted, in accordance with an exemplary embodiment. FIG. 9 is explained in conjunction with FIG. 1 to FIG. 8.

There is shown a pre-trained model 902, a cloud platform 904 associated with the pre-trained model 902, a new model 906, and a cloud platform 908 associated with the pre-trained model 906.

In an embodiment, the transfer learning approach may be used to leverage training of an AI based cloud vendor arbitrage system (such as, the AI based cloud vendor arbitrage system 102) from a previous implementation to a new implementation. The new model 906 may correspond to the new environment generated for the environment model 802 based on acceptance of one combination of the set of algorithms and functions. The new model 906 may receive the optimal values of hyperparameters represented as extracted pre-trained hyperparameters from the pre-trained model 902.

In an embodiment, the transfer learning approach may enable gathering of knowledge from an existing environment or implementation of the AI based cloud vendor arbitrage system 102. The knowledge corresponds to optimal values (i.e., the one or more feature vectors) of the plurality of metrices and hyperparameters required for the implementation of the AI based cloud vendor arbitrage system 102. Further, the optimal values of the plurality of metrices and hyperparameter may be utilized to develop the new environment for the AI based evaluation system 102. This may require less training time as compared to starting from scratch or from vanilla model. The vanilla model may correspond to a standard, usual, and unfeatured version of the AI based cloud vendor arbitrage system 102.

In accordance with an embodiment, the AI based cloud vendor arbitrage system 102 may be configured to modify at least one of the one or more first pre-trained machine learning models (such as, the pre-trained model 902) with transferable knowledge for a target system to be evaluated. The transferable knowledge may correspond to optimal values associated with the one or more feature vectors corresponding to each of the plurality of metrices.

In accordance with an embodiment, the AI based cloud vendor arbitrage system 102 may be configured to tune at least one of the one or more first pre-trained machine learning models (such as, the pre-trained model 902) using specific characteristics of the target system to create a target model (such as, the new model 606). In accordance with an embodiment, the AI based cloud vendor system 102 may be configured to evaluate the target system performance using the target model (such as, the new model 606) to predict system performance of the target system for performing cloud vendor arbitrage.

In accordance with an embodiment, the AI based cloud vendor arbitrage system 102 may be configured to modify the one or more first pre-trained machine learning model (not shown in FIG. 6) with transferable knowledge for a target system to be evaluated. The transferable knowledge corresponds to optimal values associated with the one or more feature vectors corresponding to each of the plurality of metrics. In accordance with an embodiment, the AI based cloud vendor arbitrage system 102 may be configured to tune the one or more first pre-trained machine learning model using specific characteristics of the target system to create a target model and evaluate the target system performance using the target model to predict system performance of the target system.

Figure 10:
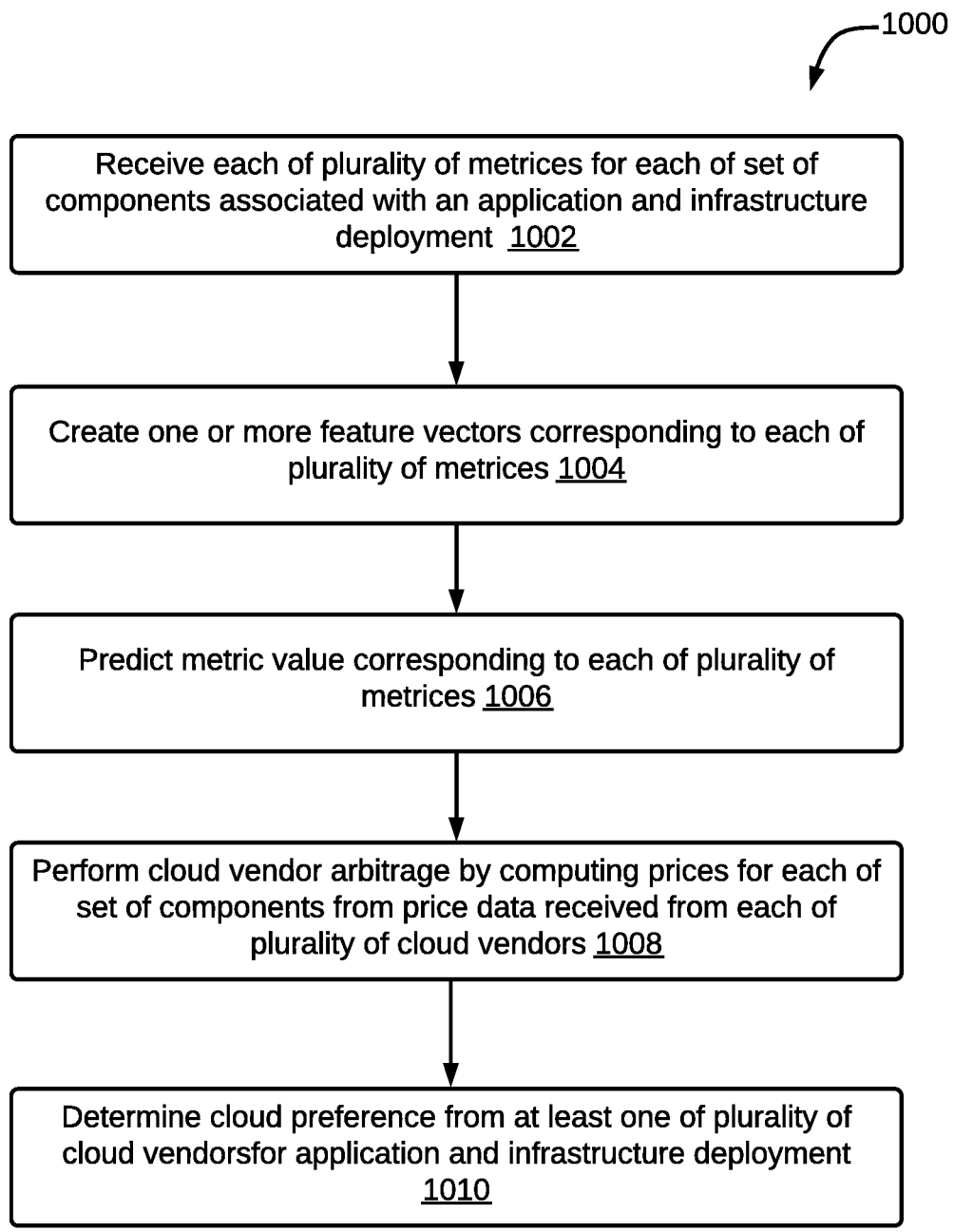
FIG. 10 illustrates a flowchart of a method for performing cloud vendor arbitrage using Artificial Intelligence (AI), in accordance with an embodiment.

FIG. 10 is a flowchart that illustrates an exemplary method for performing cloud vendor arbitrage using Artificial Intelligence (AI), in accordance with an embodiment. With reference to FIG. 10, there is shown a flowchart 1000. The operations of the exemplary method may be executed by any computing system, for example, by the AI based cloud vendor arbitrage system 102 of FIG. 1. The operations of the flowchart 1000 may start at 1002 and proceed to 1004.

At 1002, each of a plurality of metrics may be received for each of a set of components associated with an application and infrastructure deployment. In accordance with an embodiment, the AI based cloud vendor arbitrage module 214 of the AI based cloud vendor arbitrage system 102 may be configured to receive each of the plurality of metrices for each of the set of components associated with the application and infrastructure deployment. In accordance with an embodiment, the one or more of the plurality of metrices may comprise at least one of a component type, a deployment date of a component, a deployment type, an instance type, a number of connections of the component, and a number of users associated with the component.

At 1004, one or more feature vectors corresponding to each of the plurality of metrices may be created. In accordance with an embodiment, the machine learning module 216 of the AI based cloud vendor arbitrage system 102 may be configured to create one or more feature vectors corresponding to each of the plurality of metrices, based on the one or more features determined for each of the plurality of metrices. The one or more feature vectors are created based on corresponding one or more first pre-trained machine learning models.

At 1006, a metric value may be predicted corresponding to each of the plurality of metrices. In accordance with an embodiment, the ML module 216 of the AI based cloud vendor arbitrage system 102 may be configured to predict the metric value corresponding to each of the plurality of metrices, based on assessing of the one or more feature vectors using corresponding one or more first pre-trained machine learning models.

In accordance with an embodiment, prediction of the metric value corresponding to each of the plurality of metrices further comprises performing correlation analysis among the plurality of metrices for determining interdependence among the plurality of metrices.

In accordance with an embodiment, the ML module 216 may be configured to predict a second metric value using a first metric value predicted from the plurality of metrices. In accordance with an embodiment, the second metric value may be predicted based on the correlation analysis performed among the plurality of metrices.

At 1008, the cloud vendor arbitrage may be performed by computing prices for each of the set of components from price data received from each of a plurality of cloud vendors. In accordance with an embodiment, the AI based cloud vendor arbitrage module 214 of the AI based cloud vendor arbitrage system 102 may be configured to perform the cloud vendor arbitrage by computing prices for each of the set of components from price data received from each of a plurality of cloud vendors, based on the metric value predicted corresponding to each of the plurality of metrices.

At 1010, a cloud preference from at least one of the plurality of cloud vendors may be determined for the application and infrastructure deployment. In accordance with an embodiment, the AI based cloud vendor arbitrage module 214 of the AI based cloud vendor arbitrage system 102 may be configured to determine the cloud preference from at least one of the plurality of cloud vendors for the application and infrastructure deployment, based on comparison of prices from the computed prices, in response to the performing of the cloud vendor arbitrage. In accordance with an embodiment, determining the cloud preference from at least one of the plurality of cloud vendors for the application and infrastructure deployment may be based on an inverse reinforcement learning technique.

Figure 11:
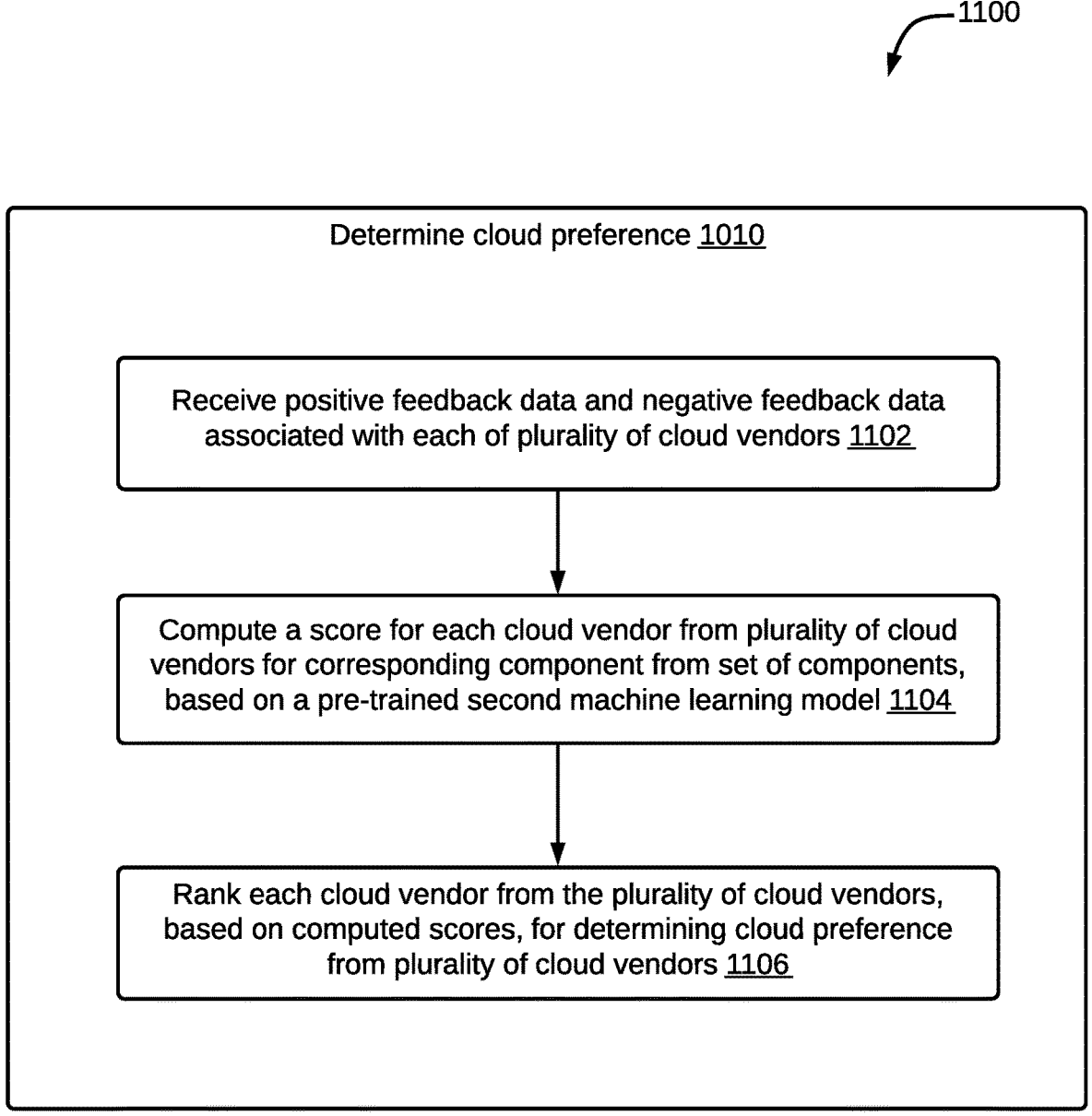
FIG. 11 illustrates a flowchart of a method for determining cloud preference from a plurality of cloud vendors, in accordance with an embodiment.

FIG. 11 is a flowchart that illustrates an exemplary method for determining cloud preference from a plurality of cloud vendors, in accordance with an embodiment. With reference to FIG. 11, there is shown a flowchart 1100. The operations of the exemplary method may be executed by any computing system, for example, by the AI based cloud vendor arbitrage system 102 of FIG. 1. The operations of the flowchart 1100 may start at 1102 and proceed to 1104.

At 1102, positive feedback data and negative feedback data associated with each of the plurality of cloud vendors may be received. In accordance with an embodiment, the AI based cloud vendor arbitrage module 214 of the AI based cloud vendor arbitrage system 102 may be configured to receive the positive feedback data and the negative feedback data associated with each of the plurality of cloud vendors.

At 1104, a score may be computed for each cloud vendor from the plurality of cloud vendors for a corresponding component from the set of components. In accordance with an embodiment, the ML module 216 of the AI based cloud vendor arbitrage system 102 may be configured to compute a score for each cloud vendor from the plurality of cloud vendors for a corresponding component from the set of components, based on a pre-trained second machine learning model.

At 1106, each cloud vendor may be ranked from the plurality of cloud vendors. In accordance with an embodiment, the ML module 216 of the AI based cloud vendor arbitrage system 102 may be configured to rank each cloud vendor from the plurality of cloud vendors, based on the computed scores, for determining the cloud preference from the plurality of cloud vendors.

Figure 12:
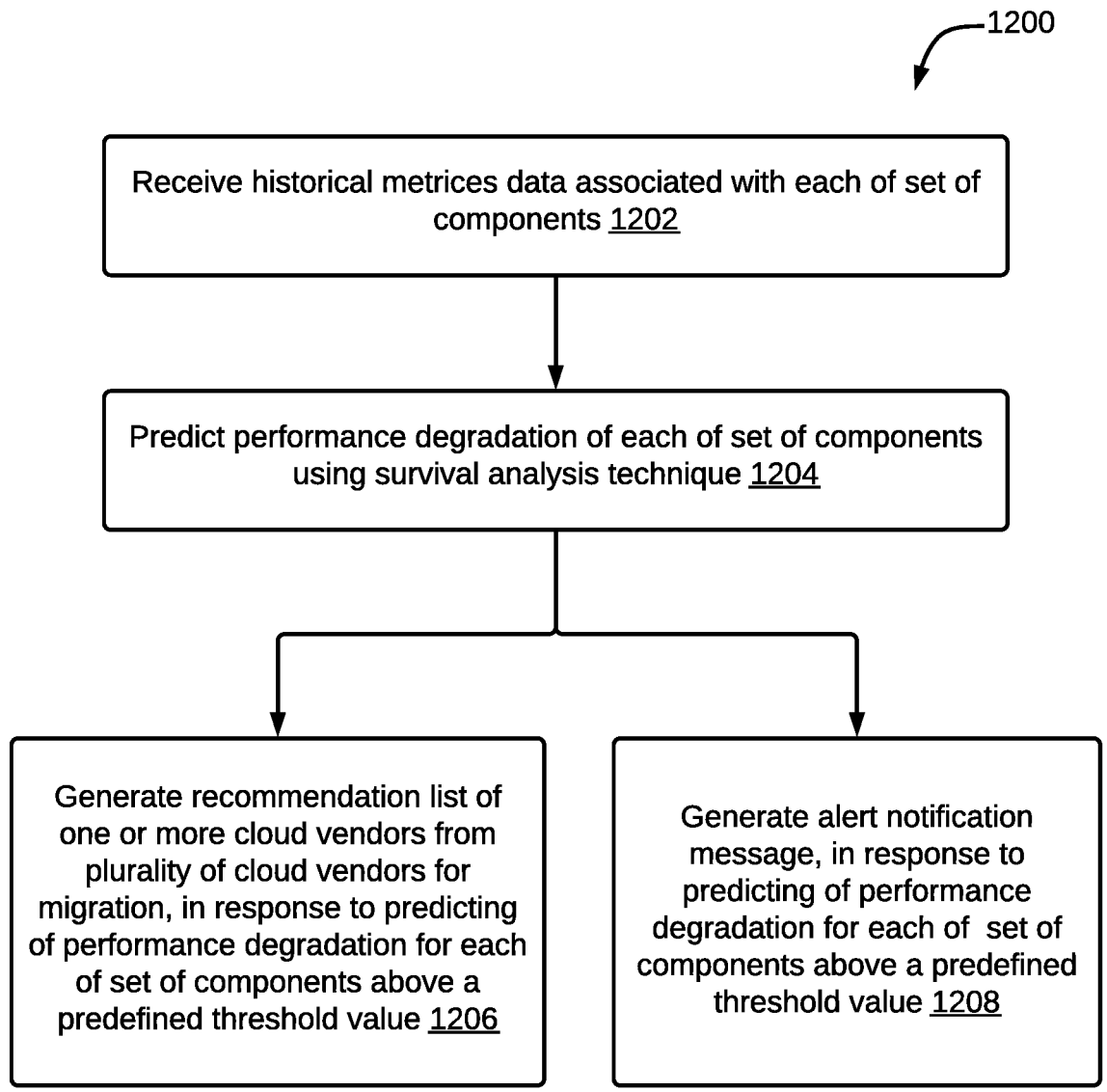
FIG. 12 illustrates a flowchart of a method for predicting performance degradation of each of a set of components, in accordance with an embodiment.

FIG. 12 is a flowchart that illustrates an exemplary method for predicting a performance degradation of each of the set of components, in accordance with an embodiment. With reference to FIG. 12, there is shown a flowchart 1200. The operations of the exemplary method may be executed by any computing system, for example, by the AI based cloud vendor arbitrage system 102 of FIG. 1. The operations of the flowchart 1200 may start at 1202 and proceed to 1204.

At 1202, historical metrices data associated with each of the set of components may be received. In accordance with an embodiment, the AI based cloud vendor arbitrage module 214 of the AI based cloud vendor arbitrage system 102 may be configured to receive the historical metrices data associated with each of the set of components.

At 1204, a performance degradation of each of the set of components may be predicted. In accordance with an embodiment, the ML module 216 of the AI based cloud vendor arbitrage system 102 may be configured to predict the performance degradation of each of the set of components using the survival analysis technique, based on the historical metrics data and the predicted metric value corresponding to each of the plurality of metrices.

At 1206, a recommendation list of one or more cloud vendors may be generated from the plurality of cloud vendors for migration. In accordance with an embodiment, the ML module 216 of the AI based cloud vendor arbitrage system 102 may be configured to generate the recommendation list of the one or more cloud vendors from the plurality of cloud vendors for migration, in response to predicting of the performance degradation for each of the set of components above a predefined threshold value.

At 1208, an alert notification message may be generated, in response to predicting of the performance degradation for each of the set of components above a predefined threshold value. In accordance with an embodiment, the ML module 216 of the AI based cloud vendor arbitrage system 102 may be configured to generate the alert notification message, in response to predicting of the performance degradation for each of the set of components above a predefined threshold value.

Figure 13:
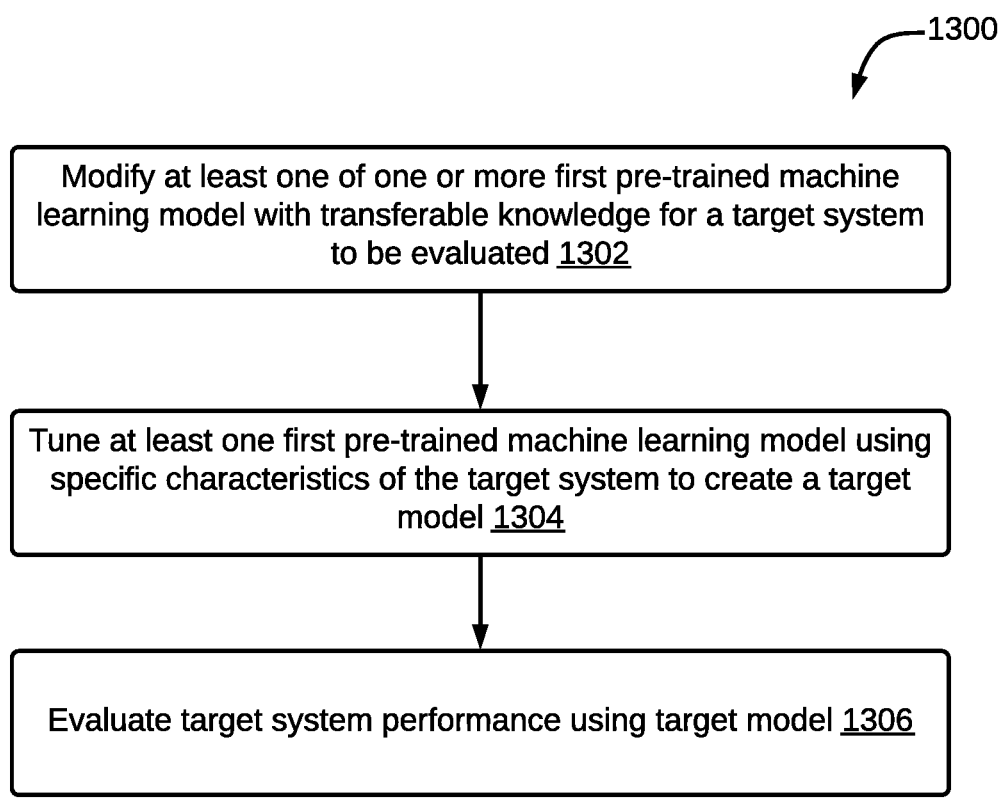
FIG. 13 illustrates a flowchart of a method for performing cloud vendor arbitrage with a transfer learning approach, in accordance with an embodiment.

FIG. 13 is a flowchart that illustrates an exemplary method for performing cloud vendor arbitrage with a transfer learning approach, in accordance with an embodiment. With reference to FIG. 13, there is shown a flowchart 1300. The operations of the exemplary method may be executed by any computing system, for example, by the AI based cloud vendor arbitrage system 102 of FIG. 1. The operations of the flowchart 1300 may start at 1302 and proceed to 1304.

At 1302, at least one of the one or more first pre-trained machine learning model may be modified with transferable knowledge for a target system to be evaluated. In accordance with an embodiment, the ML module 216 of the AI based cloud vendor arbitrage system 102 may be configured to modify at least one of the one or more first pre-trained machine learning model with transferable knowledge for a target system to be evaluated. In accordance with an embodiment, the transferable knowledge may correspond to optimal values associated with the one or more feature vectors corresponding to each of the plurality of metrices.

In accordance with an embodiment, the at least one of the one or more first pre-trained machine learning models may correspond to a Q network. In accordance with an embodiment, the Q network may be configured to receive as input an input observation, an input action and to generate an estimated future reward from the input in accordance with each of the plurality of metrices associated with the plurality of components.

In accordance with an embodiment, the at least one of the one or more first pre-trained machine learning model may be configured to compute a Q value of each of the set of components corresponding to each of the plurality of metrices using a reinforcement learning algorithm. In accordance with an embodiment, the Q value may correspond to a probability of one cloud vendor from the plurality of cloud vendors being preferred over other cloud vendors from the plurality of cloud vendors.

At 1304, the at least one of the one or more first pre-trained machine learning models may be tuned using specific characteristics of the target system. In accordance with an embodiment, the ML module 216 of the AI based cloud vendor arbitrage system 102 may be configured to tune the at least one of the one or more first pre-trained machine learning models using specific characteristics of the target system to create a target model.

At 1306, the target system performance may be evaluated using the target model. In accordance with an embodiment, the ML module 216 of the AI based cloud vendor arbitrage system 102 may be configured to evaluate the target system performance using the target model.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It will be appreciated that, for clarity purposes, the above description has described embodiments with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present disclosure has been described in connection with some embodiments, it is not intended to be limited to the specific form set forth herein. Rather, the scope of the present disclosure is limited only by the claims. Additionally, although a feature may appear to be described in connection with particular embodiments, one skilled in the art would recognize that various features of the described embodiments may be combined in accordance with the disclosure.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

It will be appreciated that, for clarity purposes, the above description has described embodiments of the disclosure with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present disclosure has been described in connection with some embodiments, it is not intended to be limited to the specific form set forth herein. Rather, the scope of the present disclosure is limited only by the claims. Additionally, although a feature may appear to be described in connection with particular embodiments, one skilled in the art would recognize that various features of the described embodiments may be combined in accordance with the disclosure.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for performing cloud vendor arbitrage using Artificial Intelligence (AI), the method comprising:
receiving, by an AI based cloud vendor arbitrage system, each of a plurality of metrices for each of a set of components associated with an application and infrastructure deployment;
receiving, by the AI based cloud vendor arbitrage system, historical metrices data associated with each of the set of components;
creating, by the AI based cloud vendor arbitrage system, one or more feature vectors corresponding to each of the plurality of metrices, based on one or more features determined for each of the plurality of metrices, wherein the one or more feature vectors are created based on corresponding one or more first pre-trained machine learning models;
predicting, by the AI based cloud vendor arbitrage system, a metric value corresponding to each of the plurality of metrices, based on assessing of the one or more feature vectors using corresponding one or more first pre-trained machine learning models;
predicting, by the AI based cloud vendor arbitrage system, a performance degradation of each of the set of components using a survival analysis technique, based on the historical metrices data and the predicted metric values corresponding to each of the plurality of metrices;
performing, by the AI based cloud vendor arbitrage system, the cloud vendor arbitrage by computing prices for each of the set of components from price data received from each of a plurality of cloud vendors, based on the metric value predicted corresponding to each of the plurality of metrices and the predicted performance degradation of each of the set of components; and
determining, by the AI based cloud vendor arbitrage system, a cloud preference from at least one of the plurality of cloud vendors for the application and infrastructure deployment, based on the performed cloud vendor arbitrage;
modifying at least one of the one or more first pre-trained machine learning model with transferable knowledge for a target system to be evaluated, wherein the transferable knowledge corresponds to optimal values associated with the one or more feature vectors corresponding to each of the plurality of metrices;
tuning the at least one of the one or more first pre-trained machine learning models using specific characteristics of the target system to create a target model; and
evaluating the target system performance using the target model to predict system performance of the target system.

2. The method of claim 1, wherein predicting the metric value corresponding to each of the plurality of metrices further comprises:
performing correlation analysis among the plurality of metrices for determining interdependence among the plurality of metrices.

3. The method of claim 2, further comprising predicting a second metric value using a first metric value predicted from the plurality of metrices, wherein the second metric value is predicted based on the correlation analysis performed among the plurality of metrices.

4. The method of claim 1, wherein determining the cloud preference further comprises:
receiving positive feedback data and negative feedback data associated with each of the plurality of cloud vendors;
computing a score for each cloud vendor from the plurality of cloud vendors for a corresponding component from the set of components, based on a pre-trained second machine learning model; and
ranking each cloud vendor from the plurality of cloud vendors, based on the computed scores, to determining the cloud preference from the plurality of cloud vendors.

5. The method of claim 1, further comprising generating a recommendation list of one or more cloud vendors from the plurality of cloud vendors for migration, in response to predicting of the performance degradation for each of the set of components above a predefined threshold value.

6. The method of claim 5, further comprising generating an alert notification message, in response to predicting of the performance degradation for each of the set of components above a predefined threshold value.

7. The method of claim 1, wherein the one or more of the plurality of metrices comprise at least one of a component type, a deployment date of a component, a deployment type, an instance type, a number of connections of the component, and a number of users associated with the component.

8. The method of claim 1, wherein determining the cloud preference from at least one of the plurality of cloud vendors for the application and infrastructure deployment is based on an inverse reinforcement learning technique.

9. The method of claim 1, wherein the at least one of the one or more first pre-trained machine learning models corresponds to a Q network, and wherein the Q network is configured to receive as input an input observation, an input action and to generate an estimated future reward from the input in accordance with each of the plurality of metrices associated with the plurality of components.

10. The method of claim 1, wherein the at least one of the one or more first pre-trained machine learning model is configured to compute a Q value of each of the set of components corresponding to each of the plurality of metrices using a reinforcement learning algorithm, and wherein the Q value corresponds to a probability of one cloud vendor from the plurality of cloud vendors being preferred over other cloud vendors from the plurality of cloud vendors.

11. A system for performing cloud vendor arbitrage using Artificial Intelligence (AI), the system comprising:
a processor; and a memory communicatively coupled to the processor, wherein the memory stores processor executable instructions, which, on execution, causes the processor to:
receive each of a plurality of metrices for each of a set of components associated with an application and infrastructure deployment;
receive historical metrices data associated with each of the set of components;
create one or more feature vectors corresponding to each of the plurality of metrices, based on one or more features determined for each of the plurality of metrices, wherein the one or more feature vectors are created based on corresponding one or more first pre-trained machine learning models;
predict a metric value corresponding to each of the plurality of metrices, based on assessing of the one or more feature vectors using corresponding one or more first pre-trained machine learning models;
predicting a performance degradation of each of the set of components using a survival analysis technique, based on the historical metrices data and the predicted metric values corresponding to each of the plurality of metrices;
perform the cloud vendor arbitrage by computing prices for each of the set of components from price data received from each of a plurality of cloud vendors, based on the metric value predicted corresponding to each of the plurality of metrices and the predicted performance degradation of each of the set of components; and
determine a cloud preference from at least one of the plurality of cloud vendors for the application and infrastructure deployment, based on the performed cloud vendor arbitrage;
modifying at least one of the one or more first pre-trained machine learning model with transferable knowledge for a target system to be evaluated, wherein the transferable knowledge corresponds to optimal values associated with the one or more feature vectors corresponding to each of the plurality of metrices;
tuning the at least one of the one or more first pre-trained machine learning models using specific characteristics of the target system to create a target model; and
evaluating the target system performance using the target model to predict system performance of the target system.

12. The system of claim 11, wherein to predict the metric value corresponding to each of the plurality of metrices, the processor executable instructions further cause the processor to:
perform correlation analysis among the plurality of metrices for determining interdependence among the plurality of metrices; and
predict a second metric value using a first metric value predicted from the plurality of metrices, wherein the second metric value is predicted based on the correlation analysis performed among the plurality of metrices.

13. The system of claim 11, wherein to determine the cloud preference, the processor executable instructions further cause the processor to:
receive positive feedback data and negative feedback data associated with each of the plurality of cloud vendors;
compute a score for each cloud vendor from the plurality of cloud vendors for a corresponding component from the set of components, based on a pre-trained second machine learning model; and
rank each cloud vendor from the plurality of cloud vendors, based on the computed scores, for determining the cloud preference from the plurality of cloud vendors.

14. The system of claim 11, wherein the processor executable instructions further cause the processor to:
generate a recommendation list of one or more cloud vendors from the plurality of cloud vendors for migration and an alert notification message, in response to predicting of the performance degradation for each of the set of components above a predefined threshold value.

15. The system of claim 11, wherein the one or more of the plurality of metrices comprise at least one of a component type, a deployment date of a component, a deployment type, an instance type, a number of connections of the component, and a number of users associated with the component.

16. The system of claim 11, wherein the at least one of the one or more first pre-trained machine learning models corresponds to a Q network, and wherein the Q network is configured to receive as input an input observation, an input action and to generate an estimated future reward from the input in accordance with each of the plurality of metrices associated with the plurality of components.

17. The system of claim 11, wherein the at least one of the one or more first pre-trained machine learning model is configured to compute a Q value of each of the set of components corresponding to each of the plurality of metrices using a reinforcement learning algorithm, and wherein the Q value corresponds to a probability of one cloud vendor from the plurality of cloud vendors being preferred over other cloud vendors from the plurality of cloud vendors.

18. A non-transitory computer-readable medium storing computer-executable instructions for contextually aligning a title of an article with content within the article, the stored instructions, when executed by a processor, cause the processor to perform operations comprising:
receiving each of a plurality of metrices for each of a set of components associated with an application and infrastructure deployment;
receiving historical metrices data associated with each of the set of components;
creating one or more feature vectors corresponding to each of the plurality of metrices, based on one or more features determined for each of the plurality of metrices, wherein the one or more feature vectors are created based on corresponding one or more first pre-trained machine learning models;
predicting a metric value corresponding to each of the plurality of metrices, based on assessing of the one or more feature vectors using corresponding one or more first pre-trained machine learning models;
predicting a performance degradation of each of the set of components using a survival analysis technique, based on the historical metrices data and the predicted metric values corresponding to each of the plurality of metrices;
performing the cloud vendor arbitrage by computing prices for each of the set of components from price data received from each of a plurality of cloud vendors, based on the metric value predicted corresponding to each of the plurality of metrices and the predicted performance degradation of each of the set of components; and determining a cloud preference from at least one of the plurality of cloud vendors for the application and infrastructure deployment, based on the performed cloud vendor arbitrage;

modifying at least one of the one or more first pre-trained machine learning model with transferable knowledge for a target system to be evaluated, wherein the transferable knowledge corresponds to optimal values associated with the one or more feature vectors corresponding to each of the plurality of metrices;

tuning the at least one of the one or more first pre-trained machine learning models using specific characteristics of the target system to create a target model; and evaluating the target system performance using the target model to predict system performance of the target system.

\* \* \* \* \*